(12) United States Patent
Yamada et al.

(10) Patent No.: US 11,315,095 B2
(45) Date of Patent: Apr. 26, 2022

(54) ELECTRONIC RECEIPT MANAGEMENT SYSTEM

(71) Applicant: TOSHIBA TEC KABUSHIKI KAISHA, Tokyo (JP)

(72) Inventors: Kuniyoshi Yamada, Tokyo (JP); Koichi Sugiyama, Izunokuni Shizuoka (JP); Yasuhiro Arai, Mishima Shizuoka (JP); Tsuyoshi Gotanda, Tokyo (JP); Makoto Yoshimura, Tokyo (JP); Takashi Nakajima, Tokyo (JP); Nobuhiro Sugita, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 16/436,399

(22) Filed: Jun. 10, 2019

(65) Prior Publication Data
US 2019/0295059 A1    Sep. 26, 2019

Related U.S. Application Data

(63) Continuation of application No. 14/734,128, filed on Jun. 9, 2015, now Pat. No. 10,387,861.

(30) Foreign Application Priority Data

Jun. 10, 2014  (JP) ................. 2014-119872

(51) Int. Cl.
*G06Q 20/20* (2012.01)
*G06Q 20/32* (2012.01)
*G06Q 20/04* (2012.01)

(52) U.S. Cl.
CPC ......... *G06Q 20/202* (2013.01); *G06Q 20/047* (2020.05); *G06Q 20/204* (2013.01); *G06Q 20/209* (2013.01); *G06Q 20/3274* (2013.01)

(58) Field of Classification Search
CPC .. G06Q 20/202; G06Q 20/047; G06Q 20/204; G06Q 20/209; G06Q 20/3274
See application file for complete search history.

(56) References Cited

U.S. PATENT DOCUMENTS

2003/0101095 A1*  5/2003  Suzuki ............... G06Q 30/0268
                                                            705/14.65
2007/0288322 A1   12/2007  Watanabe
(Continued)

FOREIGN PATENT DOCUMENTS

| CN | 102184501 A | 9/2011 |
| JP | 2003077064 A | 3/2003 |

(Continued)

OTHER PUBLICATIONS

Office Action dated Jul. 5, 2018 in corresponding Chinese Patent Application No. 201510312218.5 (Publication No. CN 105303419 A) with English translation, 23 pages.

*Primary Examiner* — A. Hunter Wilder
*Assistant Examiner* — Joseph M Mutschler
(74) *Attorney, Agent, or Firm* — Kim & Stewart LLP

(57) ABSTRACT

A distributed computer system includes a central server, a computing device of a user, and point-of-sale terminals. The central server is configured to assign a global user ID to a user and store, in association with the global user ID, local user IDs. The computing device is configured to generate and display a code symbol representing at least one user ID. A point-of-sale terminal is configured to scan the displayed code symbol and code symbols of merchandise being purchased, and generate transaction information. A local server is configured to transfer the transaction information from the point-of-sale terminal to the central server. When the transaction information includes a local user ID, a point total of the user is updated based on the transaction information and transmitted to the computing device. The central server (Continued)

stores the transaction information, which is received from the local server, in association with the global user ID.

14 Claims, 16 Drawing Sheets

(56) References Cited

U.S. PATENT DOCUMENTS

| | | | | |
|---|---|---|---|---|
| 2012/0185317 | A1* | 7/2012 | Wong | G06Q 30/0222 705/14.23 |
| 2012/0197707 | A1 | 8/2012 | Cohagan et al. | |
| 2012/0253914 | A1* | 10/2012 | Black | G06Q 30/02 705/14.28 |
| 2012/0296725 | A1* | 11/2012 | Dessert | G06Q 30/0238 705/14.27 |
| 2014/0074675 | A1* | 3/2014 | Calman | G06Q 20/047 705/35 |
| 2015/0248664 | A1* | 9/2015 | Makhdumi | G06Q 20/3276 235/380 |

FOREIGN PATENT DOCUMENTS

| | | | |
|---|---|---|---|
| JP | 2003123144 | A | 4/2003 |
| JP | 2009042931 | A | 2/2009 |
| JP | 2011090375 | A | 5/2011 |

* cited by examiner

ELECTRONIC RECEIPT MANAGEMENT SYSTEM

CROSS-REFERENCE TO RELATED APPLICATION

This application is a continuation of U.S. patent application Ser. No. 14/734,128, filed Jun. 9, 2015, which application is based upon and claims the benefit of priority from Japanese Patent Application No. 2014-119872, filed Jun. 10, 2014, the entire contents of which are incorporated herein by reference.

FIELD

Embodiments described herein relate generally to an electronic receipt management system.

BACKGROUND

An electronic receipt management system typically includes a point-of-sale (POS) terminal located at a store. The POS terminal generates a data of a purchase transaction by a customer at the store, and obtains a customer ID of the customer during the purchase transaction, for example, through a mobile device carried by the customer. Then, the data is transmitted to a communication device owned by the customer as an electronic receipt, typically through a server. As a result, the customer can view the electronic receipt on a display unit of the communication device.

On the other hand, currently many stores or a company that operates such stores implement a reward program to promote sales, and use a customer ID unique to the store or the company for the reward program. Typically, a customer needs to provide the customer ID for the reward program to the store during a purchase transaction.

Therefore, when a customer wants to use the service of the electronic receipt and participate in the reward program in one purchase transaction, the store may need to require the customer to provide two different customer IDs. It would be desirable to carry out the electronic receipt service and the reward program more efficiently.

DETAILED DESCRIPTION

According to one embodiment, a distributed computer system includes a central server, a computing device of a user, and point-of-sale terminals. The central server is configured to assign a global user ID to a user and store, in association with the global user ID, local user IDs. The computing device is configured to generate and display a code symbol representing at least one user ID. A point-of-sale terminal is configured to scan the displayed code symbol and code symbols of merchandise being purchased, and generate transaction information. A local server is configured to transfer the transaction information from the point-of-sale terminal to the central server. When the transaction information includes a local user ID, a point total of the user is updated based on the transaction information and transmitted to the computing device. The central server stores the transaction information, which is received from the local server, in association with the global user ID.

Hereinafter, two embodiments are described with reference to the accompanying drawings. In each embodiment, an electronic receipt management server is described as an example of an information processing apparatus, and a portable terminal is described as an example of a portable terminal device. As an example, reward points are offered to the customer as a kind of service. In addition, the embodiments are presented byway of example only, and are not intended to limit the scope of the invention.

First Embodiment

Figure 1:
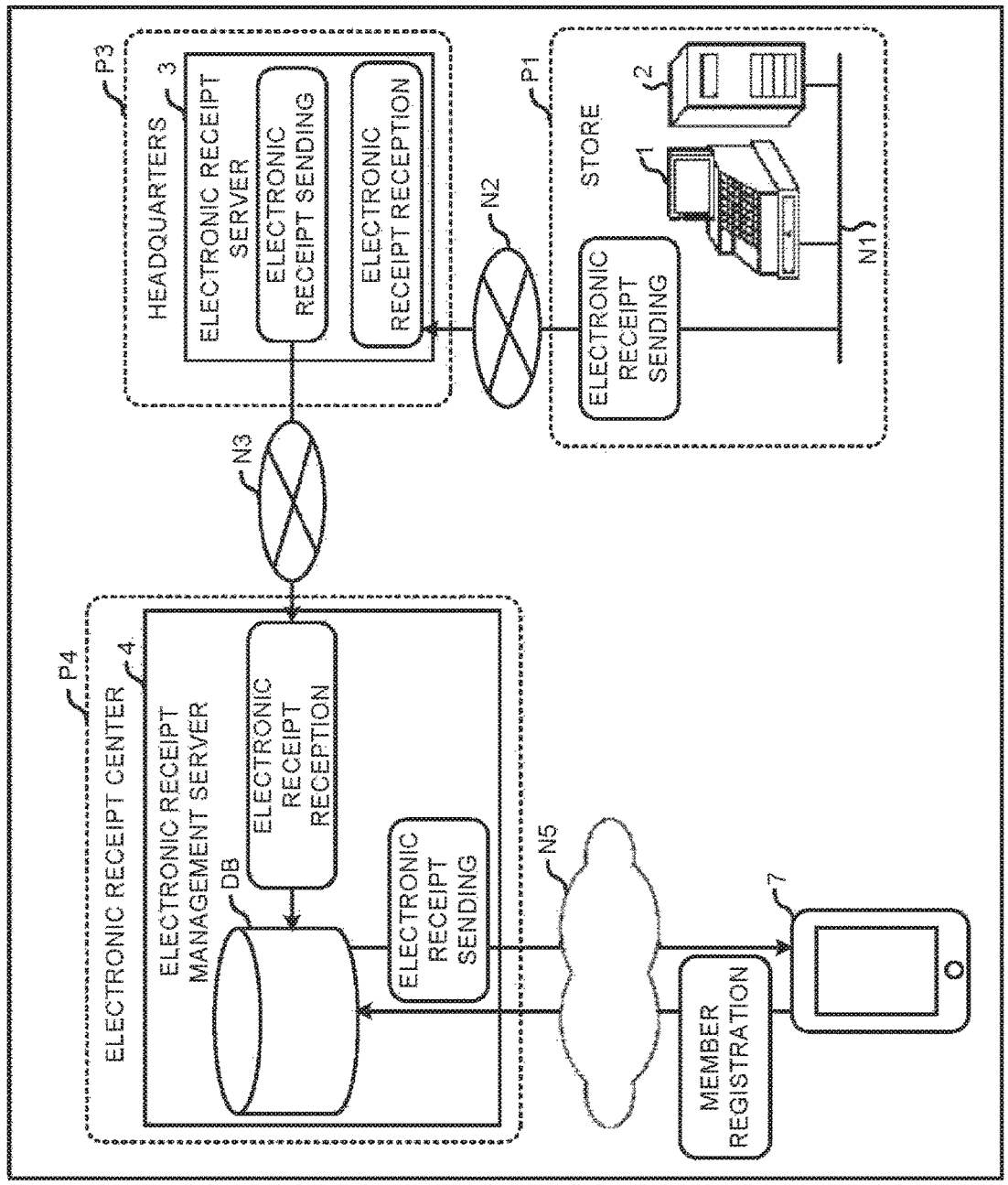
FIG. 1 illustrates a whole configuration of an electronic receipt management system according to one embodiment.

FIG. 1 illustrates the whole configuration of an electronic receipt system according to the first embodiment. As shown in FIG. 1, the electronic receipt system includes a POS (Point of Sales) terminal 1 and a store server (local server) 2 located in a store P1 such as a shopping center and the like, an electronic receipt server 3 located in a headquarters P3, an electronic receipt management server (center server) 4 located in an electronic receipt center P4, and a portable terminal (computing device) 7 carried by a customer.

The POS terminal 1 is connected to a network N2 through which the store P1 is connected to the headquarters P3. The network N2 here may be, for example, a dedicated line such as an internet or a VPN (Virtual Private Network).

The POS terminal 1 is a commodity sales data processing apparatus for executing a commodity sales data processing in the store P1. The POS terminal 1 generates receipt information serving as transaction printing information containing contents of a purchase transaction and prints the receipt information using a printing unit 13 (FIG. 2) to issue a paper receipt. The POS terminal 1 converts the data format of the unstructured receipt information to structured format, which is different from the unstructured format, to generate digitized electronic receipt information. The electronic receipt information is obtained by converting the format of the receipt information to be printed on receipt paper, to the structured format such as CSV (Comma-Separated Values) format or J-son format. The electronic receipt information is sent to the electronic receipt management server 4 via the electronic receipt server 3 and stored in the electronic receipt management server 4. The electronic receipt information stored in the electronic receipt management server 4 can be sent to the portable terminal 7 to be browsed. The portable terminal 7 displays the electronic receipt in the same format as the receipt information to be printed on the receipt paper.

The POS terminal 1 outputs (sends) the generated electronic receipt information to the electronic receipt server 3 through the network N2. No specific limitation is given to the method of sending the electronic receipt information, and for example, a general-purpose protocol such as an HTTP or an HTTPS may be used. Further, no specific limitation is given to the number of the POS terminals 1 located in the store P1; for example, a plurality of POS terminals 1 may be located in the store P1.

The POS terminal 1 calculates reward points that can be redeemed in the store P1 and correspond to amount or total price of commodities purchased by the customer and then offers the reward points to the customer. The reward points are sent to and accumulated in the store server 2 connected through a communication line N1 such as an LAN (Local Area Network).

The store server 2 manages the sales at the store P1. The store server 2 is connected to the POS terminal 1 through the communication line N1 established in the store P1. The store server 2 manages the sales information of the store P1 based on the sales information in the POS terminal 1. The store server 2 collects the sales information of each POS terminal in the store P1 as settled receipt information. The settled receipt information refers to the information obtained by collecting the sales information of commodities sold at the store P1 in a predetermined period of time (for example, one day). The settled receipt information may indicate the sales information by department or class, in addition to the total sales information in the predetermined period. For example, the settled receipt information may indicate the sales information by the other various categories, such as payment method and transaction time.

The store server 2 manages the reward points sent from the POS terminal 1 for each customer. When reward points are earned, the store server 2 accumulates the earned points, and when the earned reward points are redeemed, the store server 2 subtracts the redeemed points from the accumulated points. In this manner, the store server 2 functions as a point server. The function of the point server may be included in a device other than the store server, such as a headquarters server located in the headquarters of a company that operates the store P1.

The electronic receipt server 3 is located in the headquarters P3 of a company that runs the store P1, and functions as a receipt management server for the company.

The electronic receipt server 3 receives the electronic receipt information sent from the POS terminal 1 through the network N2, and then sends the received electronic receipt information to the electronic receipt management server 4 through a network N3 that connects the headquarters P3 and the electronic receipt center P4.

Herein, the network N3 may be, for example, a dedicated line such as an internet or a VPN. No specific limitation is given to the method of sending the electronic receipt information, and for example, a general-purpose protocol such as an HTTP or an HTTPS may be used.

The electronic receipt management server 4 is located in the electronic receipt center P4. The electronic receipt center P4 manages the electronic settlement receipt information and the electronic receipt information of multiple companies each of which manages the receipt information with the electronic receipt server 3. The electronic receipt center P4 is, for example, a third party organization other than the company that manages the electronic receipt server 3. Alternatively, the electronic receipt server 3, as well as the electronic receipt management server 4, may be managed by the third party organization.

The electronic receipt management server 4 functions as a receipt management server for customers and collectively manages the electronic receipt information of multiple companies that run stores. The electronic receipt management server 4 stores/manages, in a member master file stored in a database DB, member data such as the name and the member ID (customer code) of each customer (member) who carried out member registration, electronic receipt ID (hereinafter referred to as an "SRID" or global customer ID) serving as a unique terminal code for identifying the portable terminal 7 to which the electronic receipt information is to be sent, and sending destination information (for example, mail address) of the portable terminal 7 serving as the sending destination of the electronic receipt information. Further, a member management server and the like may be prepared separately from the electronic receipt management server 4, to store/manage the member data.

The electronic receipt management server 4 receives the electronic receipt information sent from the electronic receipt server 3 through the network N3 and then stores/manages the received electronic receipt information in an electronic receipt information column 43a2 (FIG. 6) of an electronic receipt management area 43a in the database DB. More specifically, the electronic receipt information further includes the member ID, and the store information of the store that sends the electronic receipt information, and the like in addition to the content of the transaction (commodity sales data), and is managed in association with the member data of the corresponding member.

After the electronic receipt information is stored in the electronic receipt information column 43a2, the electronic receipt management server 4 identifies the sending destination (portable terminal 7) with reference to the sending destination information associated with the member ID contained in the electronic receipt information. Then the electronic receipt management server 4 sends, through a network N5, to the sending destination a message that there is electronic receipt information to be sent.

When the electronic receipt management server 4 receives an electronic receipt inquiry designating a member ID from the portable terminal 7 connected through the network N5, the electronic receipt management server 4 extracts the electronic receipt information corresponding to the member ID from the electronic receipt information column 43a2 and sends the extracted electronic receipt information to the portable terminal 7. If additional information is associated with the electronic receipt information, the additional information is also sent to the portable terminal 7 which has sent the inquiry.

The portable terminal 7 is a portable terminal device, such as a smartphone, a mobile phone, a PDA (Personal Digital Assistant), or a tablet computer, which is carried and used by the user (customer) of the present system. The portable terminal 7 is equipped with an application such as a Web browser for browsing various kinds of information provided on the network N5.

The portable terminal 7 accesses the electronic receipt management server 4 through the network N5 to carry out member registration to the present system. Herein, the network N5 is an internet or various public networks.

In the present system, the member registration of the customer for receiving the electronic receipt information with the portable terminal 7 is carried out according to, for example, the following procedure. The customer sends an empty mail from the portable terminal 7 to the electronic receipt management server 4 through the network N5. The electronic receipt management server 4 sends a URL (Uniform Resource Locator) of a webpage for member registration to the received mail address (portable terminal 7). The customer accesses the webpage for member registration from the portable terminal 7 and inputs user information (name, sending destination information, and the like) necessary for the member registration on a displayed input screen. After the customer inputs necessary user information, the electronic receipt management server 4 executes member registration to the member master file. Sequentially, the electronic receipt management server 4 sends a member registration completion mail including a member ID and a password (tentative password) to the portable terminal 7. In this way, the member registration is completed. After the member registration is completed, a barcode converted from the SRID is displayed on a display unit of the portable terminal 7 that logged in.

After the purchase processing (transaction) is carried out at the POS terminal 1, the portable terminal 7 receives, from the electronic receipt management server 4 through the network N5, a notification that the electronic receipt information is ready to be sent from the electronic receipt management server 4. When the registered member operates the portable terminal 7 and sends the inquiry of the electronic receipt information to the electronic receipt management server 4 through the network N5, then the portable terminal 7 receives the electronic receipt information of the member from the electronic receipt management server 4. Then the portable terminal 7 displays an image of the received electronic receipt.

In the electronic receipt system according to the present embodiment, the electronic receipt information indicating the content of the purchase transaction (settlement) generated, after the commodity sales data processing is carried out in the POS terminal 1 of the store P1, is sent to the electronic receipt management server 4 via the electronic receipt server 3 and then uploaded on the Web. Thus, the portable terminal 7 equipped with the Web browser can access the URL (Uniform Resource Locator) to download to the portable terminal 7 the electronic receipt information uploaded on the Web and then display the downloaded electronic receipt using the Web browser. Further, a dedicated application for displaying the receipt may be installed on the portable terminal 7, so that the user can browse the receipt.

Next, hardware configuration of main components of the electronic receipt system according to the first embodiment is described with reference to FIG. 2-FIG. 8.

Figure 2:
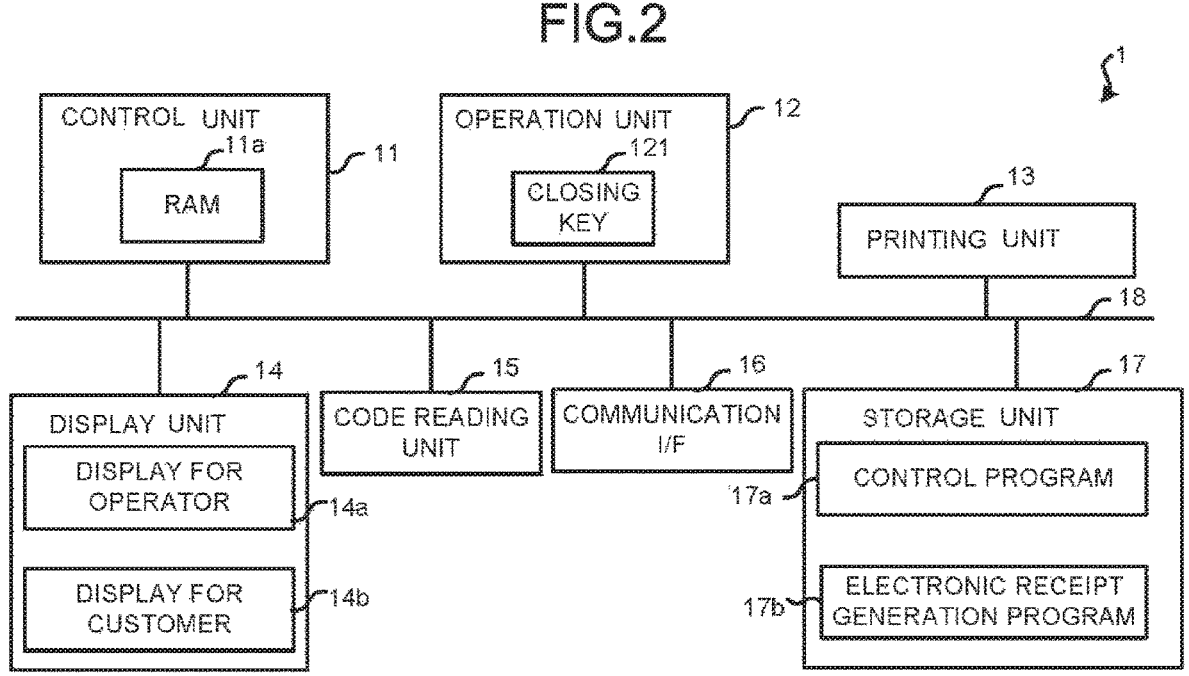
FIG. 2 is a block diagram of a POS terminal in the electronic receipt management system.

First, the POS terminal 1 is described. FIG. 2 is a block diagram of the POS terminal 1. As shown in FIG. 2, the POS terminal 1 includes a control unit 11 which controls various operations and each unit of the POS terminal 1. The control unit 11 includes a CPU (Central Processing Unit) (not shown in FIG. 2), an ROM (Read Only Memory) for storing various programs and data (not shown in FIG. 2), an RAM (Random Access Memory) 11a for storing various programs temporarily and storing various data in a rewritable manner, and an RTC (Real Time Clock) unit (not shown in FIG. 2) that indicates the current date and time.

The control unit 11 is connected to an operation unit 12, the printing unit 13, a display unit 14, a code reading unit 15, a communication I/F 16, and a storage unit 17, through a bus line 18.

The operation unit 12 includes various operation keys for an operator to carryout an input operation. The operation keys include, for example, a closing key 121 for executing the settlement processing of one transaction and terminating the transaction, in addition to a numeric key for inputting numerals, a cursor key, and a selection determination key for selecting a predetermined item.

The printing unit 13 prints a receipt, a journal, a settlement receipt, an inspection receipt, and the like. The printing unit 13 prints various kinds of information, such as information of the purchased commodity, payment information generated during the settlement processing, settlement information, and inspection information, on conveyed long-sized roll paper by, for example, a thermal head including a heat generating unit, and then cuts the paper to issue the receipt, journal, settlement receipt, an inspection receipt, and the like The display unit 14, which is, for example, a liquid crystal display, displays various kinds of information such as name and price of the sales-registered commodity, and total price, change amount, and the like of one transaction that is settled. The display unit 14 displays various kinds of information related to the issuing process of the settlement receipt, the generating and sending process of the electronic settlement receipt information, and the issuing process of the inspection receipt. The display unit 14 includes a display 14a for operator for displaying various kinds of information to a cashier and a display 14b for customer for displaying various kinds of information to the customer. The display unit 14 may be a touch panel, and in this case, the touch panel functions as the operation unit 12.

The code reading unit 15 optically reads the code symbol such as a barcode or a two-dimensional code and the like. The code reading unit 15 reads, for example, the code symbol attached to a commodity, the code symbol displayed on the display unit of the portable terminal 7, or a two-dimensional code symbol prepared near the POS terminal 1. Then the control unit 11 recognizes information contained in the read code symbol. The code symbol attached to the commodity contains a commodity code and the like for identifying the commodity. The code symbol displayed on the portable terminal 7 contains the member ID and the SRID for identifying the customer carrying the portable terminal 7. Alternatively, the SRID and the member ID may be magnetically or electrically stored in the portable terminal 7. In the latter case, the stored SRID and member ID are read through a dedicated reading device. The control unit 11 recognizes the read SRID or member ID. The two-dimensional code symbol contains a store code for identifying the store.

The control unit 11 connected to the communication I/F (interface) 16 through the bus line 18 can be connected to the network N2 through the communication I/F 16.

The control unit 11 is connected to the storage unit 17 through the bus line 18. The storage unit 17 is an auxiliary storage device such as an HDD (Hard Disk Drive) or an SSD (Solid State Drive) and the like. The storage unit 17 stores a control program 17a for executing various POS operations including the commodity sales data processing, settlement processing, and inspection processing. The control unit 11 executes the processing relating to the receipt information and the commodity sales data processing, by executing the control program 17a. The storage unit 17 further stores various data files relating to commodity sales data processing, such as a commodity data file in which commodity data, such as a commodity name, a commodity code, and a unit price, and the like, of each commodity are stored.

The storage unit 17 further stores an electronic receipt generation program 17b for generating the electronic receipt information from the receipt information. The control unit 11 executes the electronic receipt generation program 17b to convert the unstructured receipt information into the structured electronic receipt information, based on the conversion rules recorded in a receipt information schema (not shown). In this way, the control unit 11 generates the electronic receipt information from the receipt information.

The electronic receipt information generated by the POS terminal 1 includes a member ID, a company code (identification code of a company running a store), a store code, a POS number of the POS terminal 1, a receipt number, commodity sales data (including date and time data), and the like. A manufacturer of consumer goods sold at the store may acquire purchase information of the goods at the store from the electronic receipt information under a specific condition (for example, limitation of specific company running a store, a specific region limitation, a specific time limitation and the like). The electronic receipt information generated by the POS terminal 1 may also include the SRID for identifying the portable terminal 7 to which the electronic receipt information is to be sent.

The storage unit 17 also stores the POS number for identifying the POS terminal 1 of its own, a company code (identification code of a company running a store), a business type/business style code, a store code (store information) for identifying the store P1, and the like. The business type/business style code is a code (classification code) for distinguishing the business type/business style (for example, a convenience store, a supermarket, a department store, a pharmacy, and a restaurant) of the store. Further, in order to specify each store that is run by the same company, a different store code is assigned to each store. Such a business type/business style can be changed freely according to the preference of a user. The company code (identification code of a company running a store) and the business type/business style code may be registered in the electronic receipt server 3.

Figure 3:
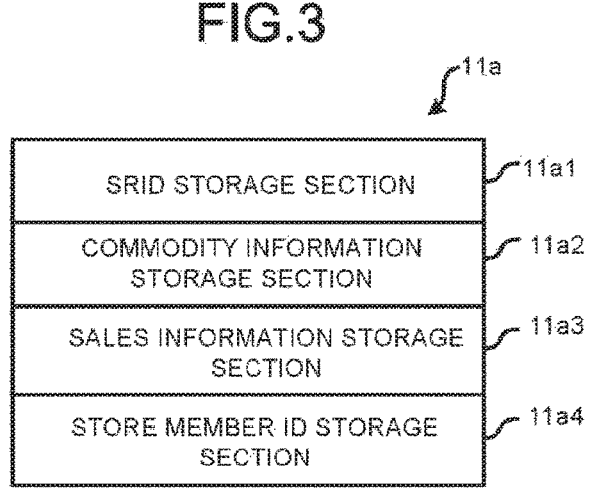
FIG. 3 is memory map of an RAM provided in the POS terminal.

Next, a memory map of the RAM 11a in the control unit 11 of the POS terminal 1 is described. In FIG. 3, the RAM 11a includes an SRID storage section 11a1, a commodity information storage section 11a2, a sales information storage section 11a3, and a store customer ID storage section 11a4.

The SRID storage section 11a1 stores SRIDs and member IDs input from the code reading unit 15. The commodity information storage section 11a2 stores commodity information (commodity code, commodity name, unit price, attribution information, and the like) read from a commodity master file (not shown) based on the commodity code input from the code reading unit 15. The sales information storage section 11a3 stores sales information, which is information obtained by accumulating and storing the settlement information and the commodity information of the settled commodity. The sales information is stored in the sales information storage section 11a3 during a predetermined period when the settlement processing is executed in the POS terminal 1. The store customer ID storage section 11a4 stores store customer IDs (local customer IDs) for identifying the loyalty card that can be used in the store P1.

The store customer ID is, for example, an ID attached to a loyalty card that is uniquely issued by the store and can only be used in the store. If the store customer ID is identified, the loyalty card issued by the store can be identified. Further, if the store customer ID is identified, the customer having the loyalty card can be identified. The store customer ID is printed on the loyalty card in the form of a code symbol.

In the present embodiment, the barcode corresponding to the store customer ID is displayed on the display unit of the portable terminal 7. The member ID can be input to the POS terminal 1 when the barcode displayed on the portable terminal 7 carried by the customer is read through the code reading unit 15. Thus, the member ID assigned to the loyalty card can be identified even if the customer carries only the portable terminal 7 without carrying the loyalty card.

Figure 4:
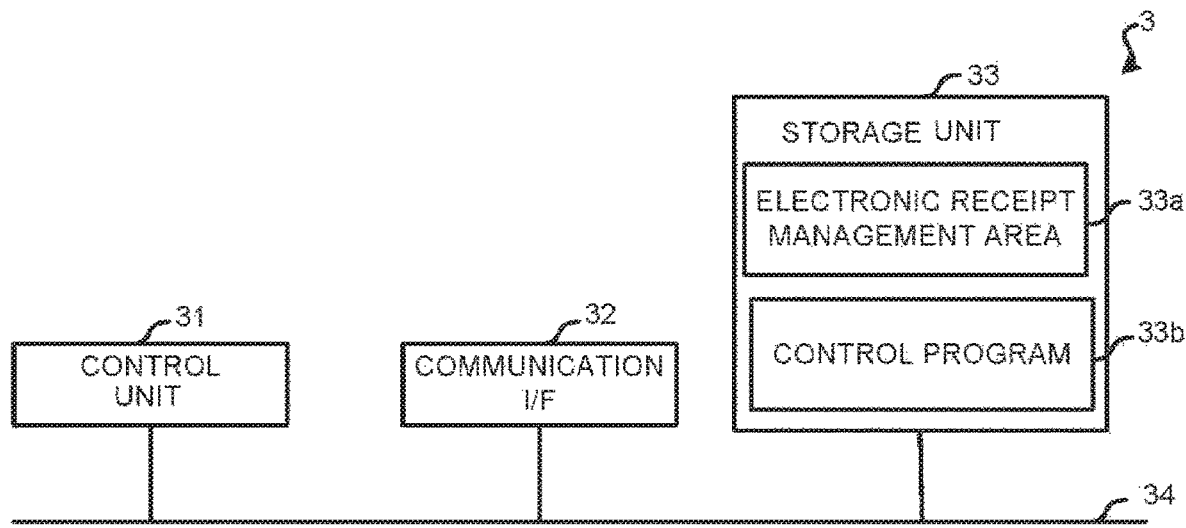
FIG. 4 is a block diagram of an electronic receipt server in the electronic receipt management system.

Next, hardware configuration of the electronic receipt server 3 functioning as a receipt management server for a company is described with reference to the block diagram shown in FIG. 4. The electronic receipt server 3 includes a control unit 31 for controlling various operations and each unit of the electronic receipt server 3. The control unit 31 includes a CPU, an ROM for storing various programs and data, an RAM for storing various programs that temporarily stores data or stores data in a rewritable manner, and an RTC unit that indicates the current date and time, and the like.

The control unit 31 can be connected to the network N2 and the network N3 through a communication I/F 32 connected to a bus line 34. The control unit 31 is connected to a storage unit 33 through the bus line 34.

The storage unit 33 stores the electronic receipt information for a company running one or more stores, in an electronic receipt management area 33a. The electronic receipt information contains a company code (identification code of a company running a store), a business type/business style code, one or more store codes, member IDs of the customers, POS numbers of the POS terminals 1, the receipt numbers, the commodity sales data, and the like. The storage unit 33 further stores a control program 33b for managing the electronic receipt information stored in the electronic receipt management area 33a.

Figure 5:
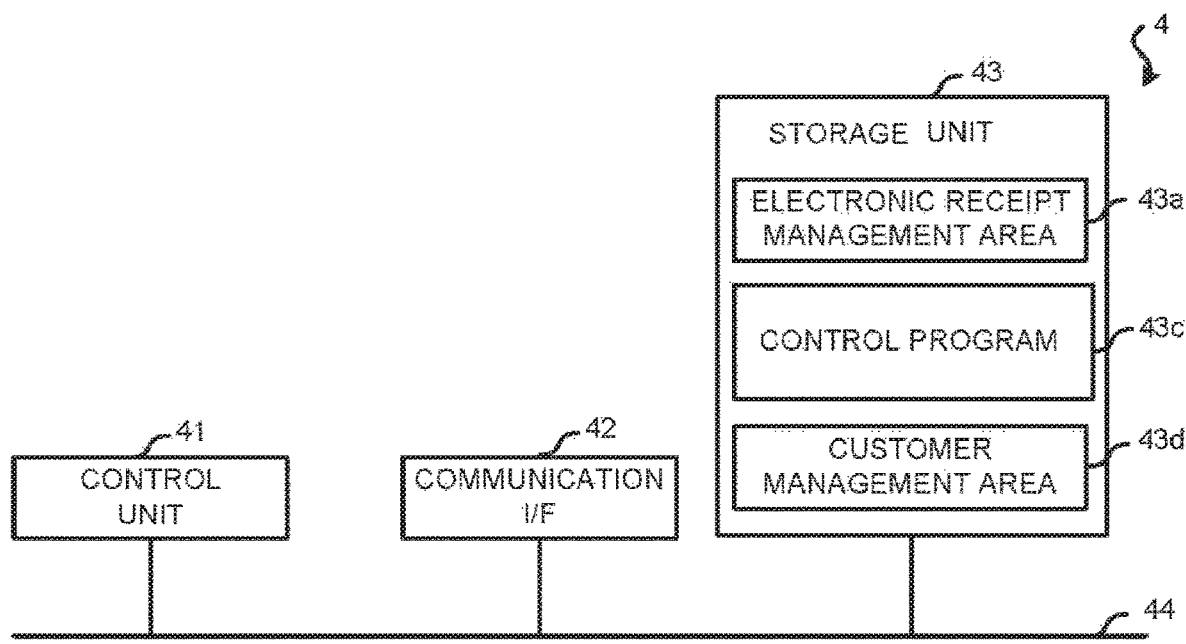
FIG. 5 is a block diagram of an electronic receipt management server in the electronic receipt management system.

Next, hardware configuration of the electronic receipt management server 4 functioning as a receipt management server for customers is described with reference to the block diagram shown in FIG. 5. As shown in FIG. 5, the electronic receipt management server 4 includes a control unit 41 for controlling various operations and each unit of the electronic receipt management server 4. The control unit 41 is includes a CPU, an ROM for storing various programs and data, an RAM for storing various programs that temporarily store data or stores data in a rewritable manner, and an RTC unit that indicates the current date and time, and the like.

The control unit 41 can be connected to the network N3 and the network N5 through a communication I/F 42 connected to a bus line 44. The control unit 41 is connected to a storage unit 43 through the bus line 44.

The storage unit 43 includes the electronic receipt management area 43a, a control program 43c, and a customer management area 43d. The electronic receipt management area 43a contains, for each member, the electronic receipt information of various companies running stores, which is received from the electronic receipt server 3.

The control program 43c is for controlling the electronic receipt management area 43a and the like. The customer management area 43d is used to manage customer data of the customer who carries the portable terminal 7.

Figure 6:
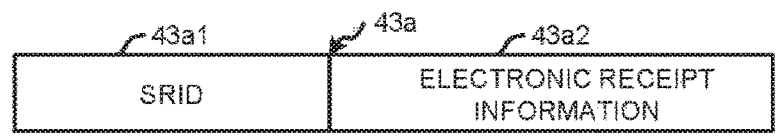
FIGS. 6 and 7 are each a memory map of a storage unit of the electronic receipt management server.

Next, the electronic receipt management area 43a is described with reference to FIG. 6. In FIG. 6, the electronic receipt management area 43a contains the electronic receipt information generated in the transaction, with respect to each transaction. The electronic receipt management area 43a includes an SRID column 43a1 for storing the SRID serving as the terminal code for identifying the portable terminal 7 to which the electronic receipt is to be sent, and an electronic receipt information column 43a2. The SRID column 43a1 stores the SRID read by the code reading unit 15 of the POS terminal 1. The electronic receipt information column 43a2 stores the electronic receipt information obtained by converting the receipt information of one transaction into an electronic receipt with respect to each transaction, in association with the SRID. Thus, in the present embodiment, the electronic receipt information contains the SRID stored in the SRID column 43a1 and the electronic receipt information stored in the electronic receipt information column 43a2.

Figure 7:
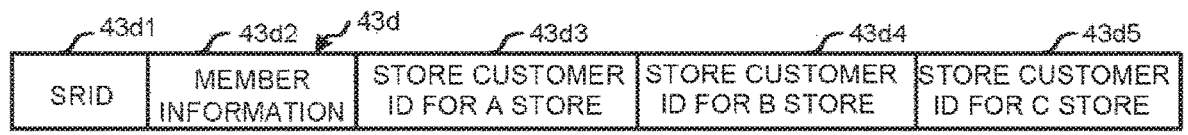

Next, the customer management area 43d is described in detail with reference to FIG. 7. The customer management area 43d stores the store customer ID for identifying the loyalty card issued by each store in association with the SRID for identifying the portable terminal 7. In FIG. 7, the customer management area 43d includes an SRID column 43d1, a member information column 43d2, a store customer ID column 43d3 of an A store, a store customer ID column 43d4 of a B store, and a store customer ID column 43d5 of a C store. In the present embodiment, as one example, the store customer IDs of three stores (A store, B store and C store) are managed.

The SRID column 43d1 stores the SRID for identifying the portable terminal 7 to which the electronic receipt is to be sent. The member information column 43d2 stores the member information (including the address of the portable terminal 7 and the information of the member such as the name, address, phone number, family structure, preference, and purchase history) of the member identified from the store customer ID or the SRID.

The store customer ID column 43d3 stores the store customer ID for A store for identifying the loyalty card issued by the A store and carried by the customer identified from the SRID, together with the store code for identifying the A store. The store customer ID column 43d4 stores the store customer ID for B store for identifying the loyalty card issued by the B store and carried by the customer identified from the SRID, together with the store code for identifying the B store. The store customer ID column 43d5 stores the store customer ID for C store for identifying the loyalty card issued by the C store and carried by the customer identified from the SRID, together with the store code for identifying the C store.

Herein, the store customer ID for A store, the store customer ID for B store, and the store customer ID for C store are different from each other although these are all correlated to the same SRID. Further, the A store, the B store, and the C store may be different stores of the same company or stores of different companies.

Figure 8:
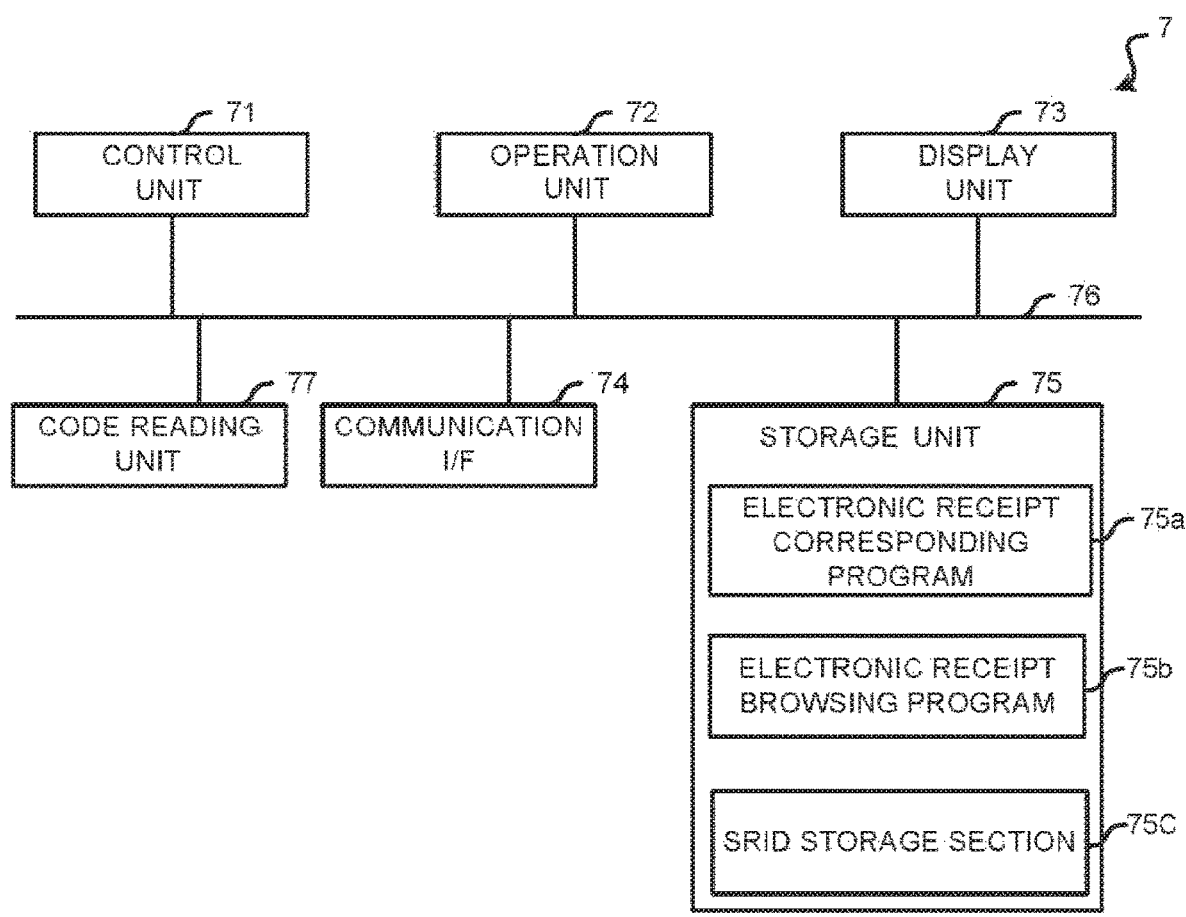
FIG. 8 is a block diagram of a portable terminal in the electronic receipt management system according to a first embodiment.

Next, hardware configuration of the portable terminal 7 is described with reference to the block diagram shown in FIG. 8. As shown in FIG. 8, the portable terminal 7 includes a control unit 71 for controlling various operations and each unit of the portable terminal 7. The control unit 71 includes a CPU, an ROM for storing various programs and data, an RAM for storing various programs that temporarily stores data or stores data in a rewritable manner, an RTC that indicates the current date and time, and the like.

An operation unit 72 is connected to a display unit 73 through a bus line 76. The operation unit 72 includes various operation keys for an operator (customer) to carryout an input operation, and a pointing device. The display unit 73, which is, for example, a liquid crystal display and the like, displays various kinds of information such as electronic receipt information and the like. The display unit 73 may be a touch panel, and in this case, the touch panel functions as the operation unit 72.

The control unit 71 is connected to a communication I/F 74 through the bus line 76, and can be connected to the network N5 through the communication I/F 74.

The control unit 71 is connected to a storage unit 75 through the bus line 76. In addition to a Web browser for browsing various kinds of information (contents) disclosed on the Web, the storage unit 75 further stores an electronic receipt corresponding program. 75a for receiving the electronic receipt information from the electronic receipt management server 4, an electronic receipt browsing program 75b for browsing the received receipt information, and an SRID storage section 75c for storing the SRID for identifying the portable terminal 7 to which the electronic receipt information is sent. The SRID stored in the SRID storage section 75c is displayed on the display unit 73 in the form of a code symbol by logging the portable terminal 7 in and carrying out an authentication. The POS terminal 1 reads the code symbol displayed on the display unit 73 with the code reading unit 15 to input the SRID in the POS terminal 1.

The SRID, which is not limited to be read as a code symbol, may also be read magnetically or electrically by the POS terminal 1. Further, the SRID may be read from a member card and the like other than the portable terminal 7. The customer ID for identifying the customer other than the SRID may be read as well. In this case, the SRID stored in the corresponding electronic receipt management server 4 is acquired based on the read customer ID.

The control unit 71 is connected to a code reading unit 77 through the bus line 76. The code reading unit 77 reads a two-dimensional code. The two-dimensional code containing the store code for identifying the store is prepared near the POS terminal 1 or the entrance of the store P1. The code reading unit 77 of the portable terminal 7 scans the attached two-dimensional code through a camera function (not shown) and reads the store code contained in the two-dimensional code.

Though it is exemplified in the present embodiment that the two-dimensional code is read by the code reading unit 77 of the portable terminal 7 to input the store code, the present invention is not limited to this. For example, the store code may be input in the portable terminal 7 in the following ways.

1) Receiving, with the portable terminal 7, a signal containing the store code sent from the POS terminal 1 or a device near the entrance of the store through a well-known wireless communication technology to input the store code. The wireless communication technology is preferably a near-distance wireless communication such as NFC (Near Field Communication), infrared ray, Bluetooth (registered trademark) and the like, but may also be other wireless communication technology.

2) The portable terminal 7 including a GPS (Global Positioning System) function identifies the location thereof, and identifies the store from the address information of the store and then extracts the store code of the identified store from the pre-stored store codes.

3) Collecting the sound of a particular range emitted from the POS terminal 1 or a device near the entrance of the store with a microphone (not shown) of the portable terminal 7; the portable terminal 7 extracts the store code of the store identified from the collected sound from a plurality of store codes stored in advance.

Next, the control processing executed by each unit of the first embodiment is described with reference to FIGS. 9-14.

First, the control processing, which is carried out when the control unit 11 of the POS terminal 1 executes the control program 17*a* and the electronic receipt generation program 17*b*, is described with reference to the flowchart shown in FIG. 9.

Figure 9:
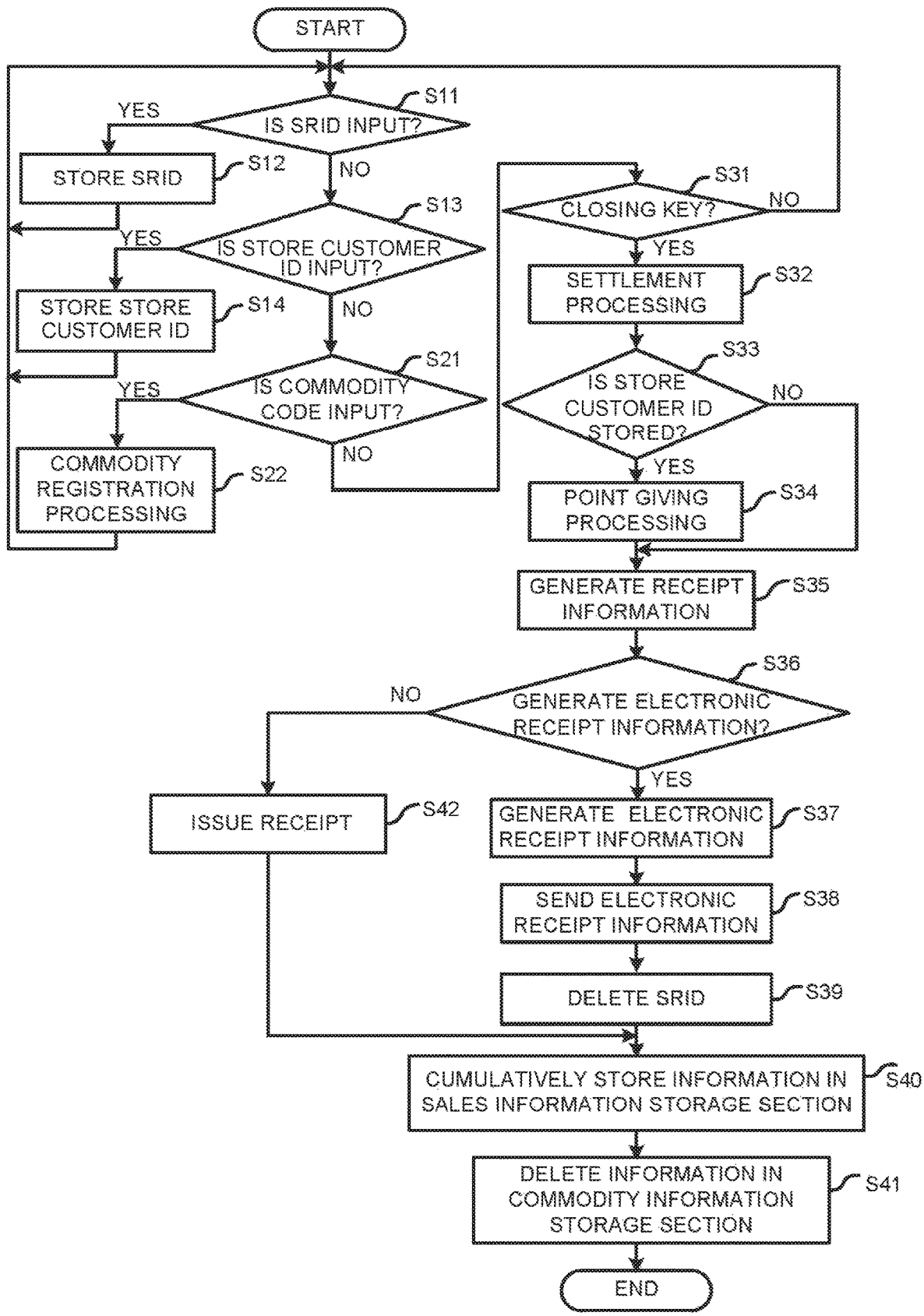
FIG. 9 is a flowchart illustrating the flow of a control processing carried out by the POS terminal.

In FIG. 9, the control unit 11 of the POS terminal 1 determines whether or not the SRID stored in the portable terminal 7 is input through the code reading unit 15 (ACT S11). If it is determined that the SRID is input (YES in ACT S11), the control unit 11 stores the input SRID in the SRID storage section 11*a*1 in the RAM 11*a* of the control unit 11 (ACT S12). Then the control unit 11 returns to ACT S11.

If it is determined that the SRID is not input (NO in ACT S11), the control unit 11 determines whether or not the store customer ID is input through the code reading unit 15 (ACT S13). If it is determined that the store customer ID is input (YES in ACT S13), the control unit 11 stores the input store customer ID in the store customer ID storage section 11*a*4 in the RAM 11*a* of the control unit 11 (ACT S14). Then the control unit 11 returns to ACT S11.

On the other hand, if it is determined that the store customer ID is not input (NO in ACT S13), the control unit 11 determines whether or not the code symbol attached to the commodity is read and the commodity code is input through the code reading unit 15 (ACT S21). If it is determined that the commodity code is input (YES in ACT S21), the control unit 11 executes commodity registration processing based on the commodity code (ACT S22). Then the control unit 11 returns to ACT S11.

The commodity registration processing refers to searching the commodity master file (not shown) stored in the storage unit 17 using the input commodity code as a key, reading the commodity information (such as commodity code, commodity name, unit price, attribution information and the like) stored in the commodity master file in association with the input commodity code, and storing the read commodity information in the commodity information storage section 11*a*2 in the RAM 11*a*.

If it is determined that the commodity code is not input (NO in ACT S21), the control unit 11 determines whether or not the closing key 121 is operated (ACT S31). If it is determined that the closing key 121 is operated (YES in ACT S31), the control unit 11 executes the settlement processing of the transaction (ACT S32). The settlement processing refers to calculating the total price based on the commodity information stored in the commodity information section, displaying the calculated total price on the display unit 14, and then terminating the transaction upon payment in various methods.

Next, the control unit 11 determines whether or not the store customer ID is stored in the store customer ID storage section 11*a*4 (ACT S33). If it is determined that the store customer ID is stored in the store customer ID storage section 11*a*4 (YES in ACT S33), the control unit 11 gives reward points based on the total price calculated in ACT S32 (ACT S34). Specifically, the control unit 11 calculates the reward points earned by the transaction based on the total price and a standard amount per reward point. Then the control unit 11 sends the calculated reward points to the store server 2 functioning as a point server.

Next, the control unit 11 generates the unstructured receipt information to be printed on a receipt paper based on the commodity information (such as commodity name, unit price, settlement amount and the like) of the transaction (ACT S35). When the SRID is stored in the SRID storage section 11*a*1, the SRID is included in the unstructured receipt information in ACT S35. If the store customer ID is not stored in the store customer ID storage section 11*a*4 (NO in ACT S33), the control unit 11 executes the processing in ACT S35 directly without executing the reward point giving processing in ACT S34.

Next, the control unit 11 determines whether or not it is necessary to generate the electronic receipt information based on the receipt information (ACT S36). If the SRID is contained in the generated receipt information, the control unit 11 determines that it is necessary to generate the electronic receipt information.

If it is necessary to generate the electronic receipt information (YES in ACT S36), the control unit 11 executes the electronic receipt generation program 17*b* to convert the unstructured receipt information generated in ACT S35 to the structured electronic receipt information (ACT S37). As shown by the example in FIG. 6, the SRID is contained in the generated electronic receipt information. Then the control unit 11 sends the generated electronic receipt information containing the generated SRID to the electronic receipt server 3 (ACT S38).

Next, the control unit 11 deletes the SRID stored in the SRID storage section 11*a*1 (ACT S39). Then, the control unit 11 cumulatively stores the commodity information stored in the commodity information storage section 11*a*2 in the sales information storage section 11*a*3 (ACT S40). Then, the control unit 11 deletes the commodity information stored in the commodity information storage section 11*a*2 (ACT S41). Sequentially, the control unit 11 terminates the present processing. On the other hand, in ACT S36, if it is not necessary to generate the electronic receipt information, the control unit 11 controls the printing unit 13 to issue a paper receipt on which the receipt information is printed (ACT S42).

Figure 10:
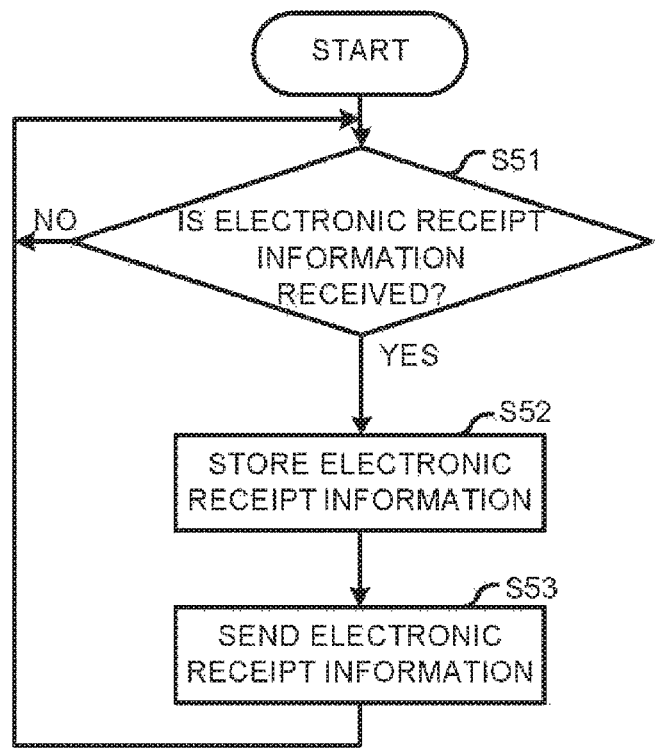
FIG. 10 is a flowchart illustrating the flow of a control processing carried out by the electronic receipt server.

Next, the flow of electronic receipt management processing carried out when the control unit 31 of the electronic receipt server 3 executes the control program 33*b* is described with reference to the flowchart shown in FIG. 10.

The control unit 31 of the electronic receipt server 3 determines whether or not the electronic receipt information sent from the POS terminal 1 in ACT S38 is received through the communication I/F 32 (ACT S51). If it is determined that the electronic receipt information is received (YES in ACT S51), the received information is stored in the electronic receipt management area 33*a* of the storage unit 33 as the electronic receipt information of the corresponding company (ACT S52). Then the control unit 31 sends the electronic receipt information stored in ACT S52 to the electronic receipt management server 4 (ACT S53), and then the processing in ACT S51 is carried out repeatedly for different electronic receipt information.

Next, the control processing carried out when the control unit 41 of the electronic receipt management server 4 executes the electronic receipt generation program 43*b* and the control program 43*c*, is described with reference to the functional block diagram shown in FIG. 11 and the flowchart shown in FIG. 12.

Figure 11:
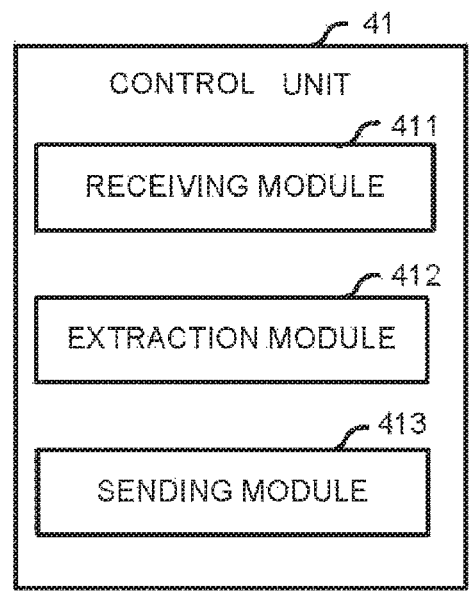
FIG. 11 illustrates functional blocks generated in the electronic receipt management server.

As shown in FIG. 11, when the electronic receipt generation program 43b and the control program 43c are executed by the electronic receipt management server 4, modules including a receiving module 411, an extraction module 412, and a sending module 413 are generated. As practical hardware, the CPU of the control unit 41 reads and executes the control program 43c from the storage unit 43 to generate the receiving module 411, the extraction module 412, and the sending module 413.

The receiving module 411 receives first customer identification information and store identification information from the portable terminal device.

The extraction module 412 searches the storage unit to extract second customer identification information corresponding to the received first customer identification information and the store identification information.

The sending module 413 sends the extracted second customer identification information to the portable terminal 7.

Figure 12:
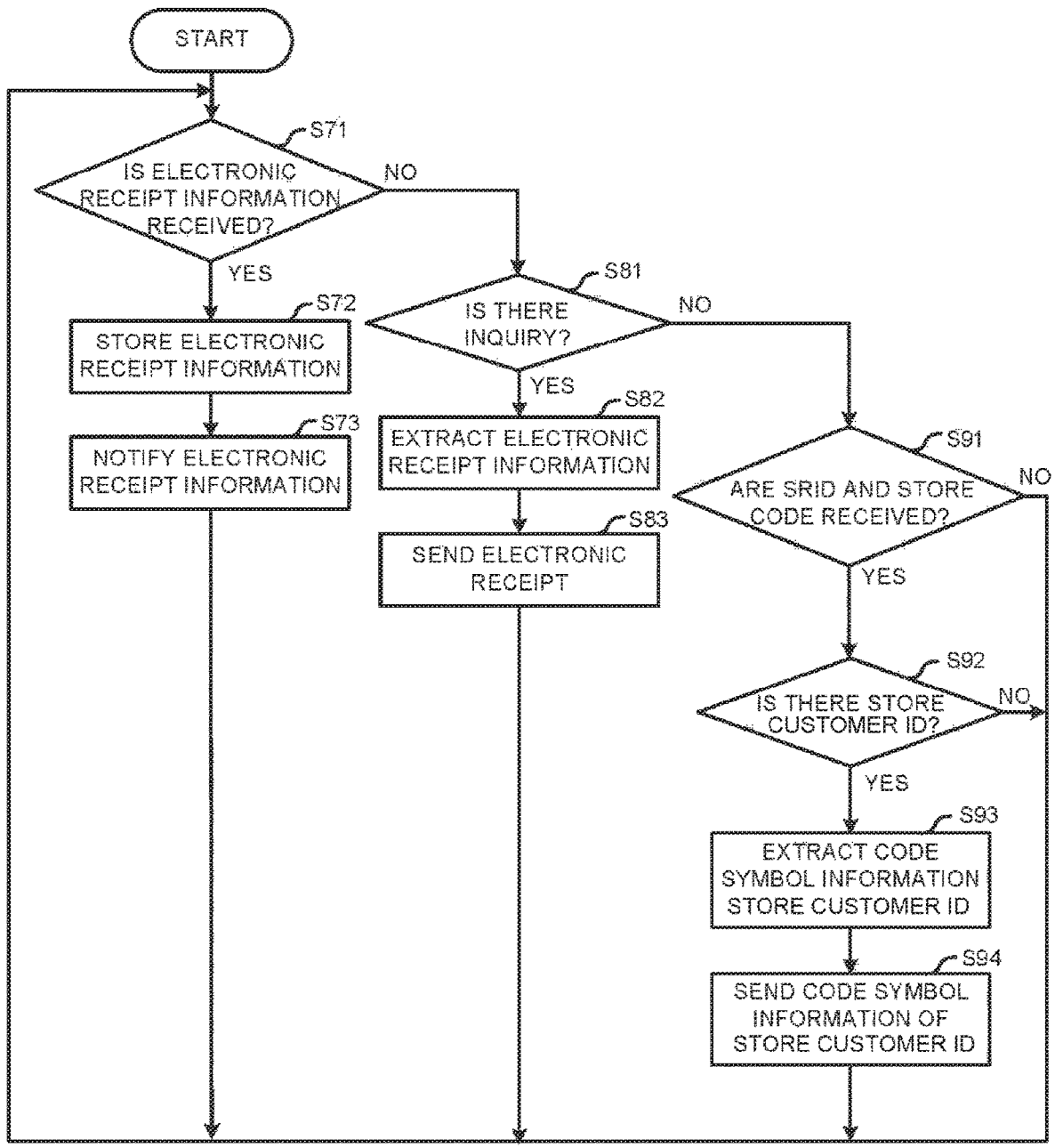
FIG. 12 is a flowchart illustrating the flow of a control processing carried out by the electronic receipt management server.

FIG. 12 is a flowchart illustrating the control processing carried out by the electronic receipt management server 4. In FIG. 12, the control unit 41 determines whether or not the electronic receipt information is received from the electronic receipt server 3 (ACT S71). If it is determined that the electronic receipt information is received (YES in ACT S71), the control unit 41 stores the received SRID in the SRID column 43a1, and then stores the corresponding electronic receipt information in the electronic receipt information column 43a2 (ACT S72). Then the control unit 41 notifies the portable terminal 7 associated with the address stored in the electronic receipt information column 43a2 that there is the electronic receipt information available (ACT S73). Then the control unit 41 returns to ACT S71.

On the other hand, if it is determined that the electronic receipt information is not received from the electronic receipt server 3 (NO in ACT S71), the control unit 41 determines whether or not there is an electronic receipt information inquiry sent from the portable terminal 7 (ACT S81). The electronic receipt information inquiry is sent by operating the portable terminal that receives the notification in ACT S73 (detailed description is given below with reference to FIG. 14).

If it is determined that there is an electronic receipt information inquiry (YES in ACT S81), the control unit 41 extracts the electronic receipt information corresponding to the inquiry from the electronic receipt management area 43a (ACT S82). Then, the control unit 41 sends, using the address contained in the extracted electronic receipt information, the electronic receipt information to the portable terminal 7 associated with the address (ACT S83). Then the control unit 41 returns to ACT S71.

On the other hand, if it is determined that there is no electronic receipt information inquiry (NO in ACT S81), the control unit 41 (receiving module 411) determines whether or not the SRID and the store code for identifying the store (sent in ACT S110 in FIG. 14) are received from the portable terminal 7 (ACT S91). If it is determined that the SRID and the store code are received (YES in ACT S91), the control unit 11 determines whether or not the store customer ID corresponding to the received SRID and store code is stored (ACT S92). Here, the customer management area 43d is referred to using the received SRID and store code, and if the store code identifies the A store, it is determined whether or not the store customer ID is stored in the store customer ID column 43d3 of the A store. If the store code identifies the B store, it is determined whether or not the store customer ID is stored in the store customer ID column 43d4 of the B store. Further, if the store code identifies the C store, it is determined whether or not the store customer ID is stored in the store customer ID column 43d5 of the C store.

If it is determined that the store customer ID is stored (YES in ACT S92), the control unit 11 (extraction module 412) reads the store customer ID from the customer management area 43d (ACT S93). The read store customer ID is the information converted into the code symbol. Then the control unit 11 (sending module 413) sends the code symbol information of the read store customer ID to the portable terminal 7 (ACT S94). Then, the control unit 11 returns to ACT S71. The processing of converting the store customer ID into the code symbol may be carried out by the electronic receipt management server 4 or the portable terminal 7.

On the other hand, if it is determined in ACT S91 that the SRID and the store code are not received (NO in ACT S91), or if it is determined in ACT S92 that the store customer ID corresponding to the received SRID and store code is not stored (NO in ACT S92), the control unit 11 returns to ACT S71.

According to the first embodiment, the electronic receipt management server 4 reads, based on the received SRID and store information, the store customer ID (that is, the store customer ID for identifying the customer of the store) for identifying the loyalty card that can be used in the store and sends the read store customer ID to the portable terminal 7. The portable terminal 7 displays the barcode corresponding to the received store customer ID on the display unit 73. As a result, the portable terminal 7 receiving the store customer ID can display the store customer ID. Since the portable terminal 7 can display the customer identification information in the store instead of the SRID, the POS terminal 1 which reads the displayed information can give reward points to the customer identified from the store customer ID.

Next, the flow of the electronic receipt reception processing carried out when the control unit 71 of the portable terminal 7 executes the electronic receipt corresponding program 75a, and the flow of the electronic receipt browsing processing carried out when the control unit 71 of the portable terminal 7 executes the electronic receipt browsing program 75b, are described with reference to the functional block diagram shown in FIG. 13 and the flowchart shown in FIG. 14.

Figure 13:
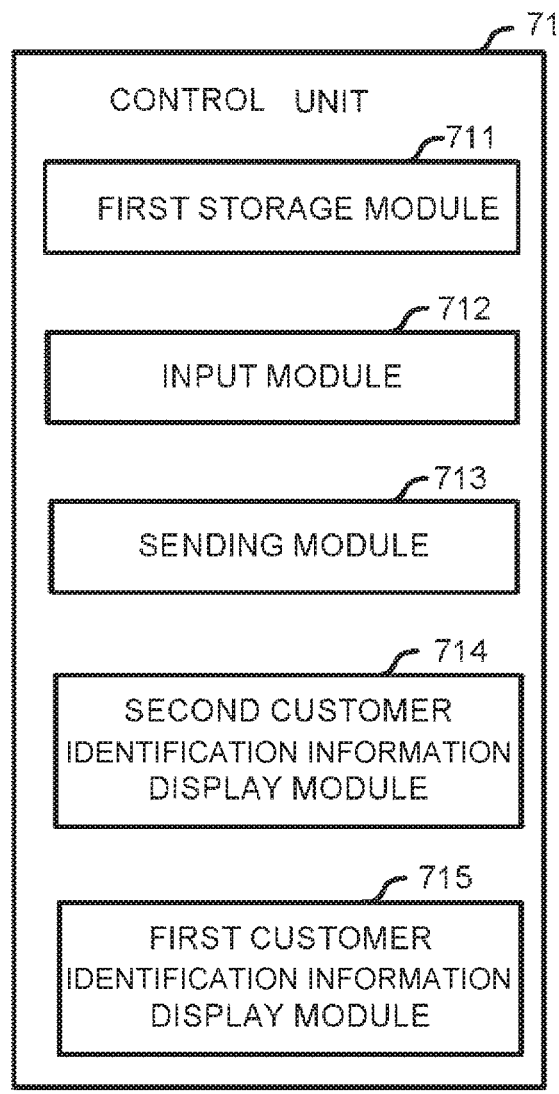
FIG. 13 illustrates functional blocks generated in the portable terminal according to the first embodiment.

As shown in FIG. 13, when the electronic receipt corresponding program 75a and the electronic receipt browsing program 75b are executed by the portable terminal 7, modules including a first storage module 711, an input module 712, a sending module 713, a second customer identification information display module 714, and a first customer identification information display module 715 are generated. As practical hardware, the CPU of the control unit 71 reads and executes the electronic receipt corresponding program 75a and the electronic receipt browsing program 75b from the storage unit 75 to generate the first storage module 711, the input module 712, the sending module 713, the second customer identification information display module 714, and the first customer identification information display module 715.

The first storage module 711 stores the first customer identification information for identifying the customer.

The input module 712 inputs the store identification information for identifying the store.

The sending module 713 sends the input store identification information to the information processing apparatus together with the stored first customer identification information.

The second customer identification information display module 714 displays the second customer identification information different from the first customer identification information for identifying the customer in response to the store identification information received from the information processing apparatus corresponding to the sending of the store identification information and the first customer identification information.

The first customer identification information display module 715 displays the first customer identification information.

Next, the flow of the electronic receipt reception processing carried out when the control unit 71 of the portable terminal 7 executes the electronic receipt corresponding program 75a and the flow of the electronic receipt browsing processing carried out when the control unit 71 of the portable terminal 7 executes the electronic receipt browsing program 75b, are described with reference to FIG. 14.

Figure 14:
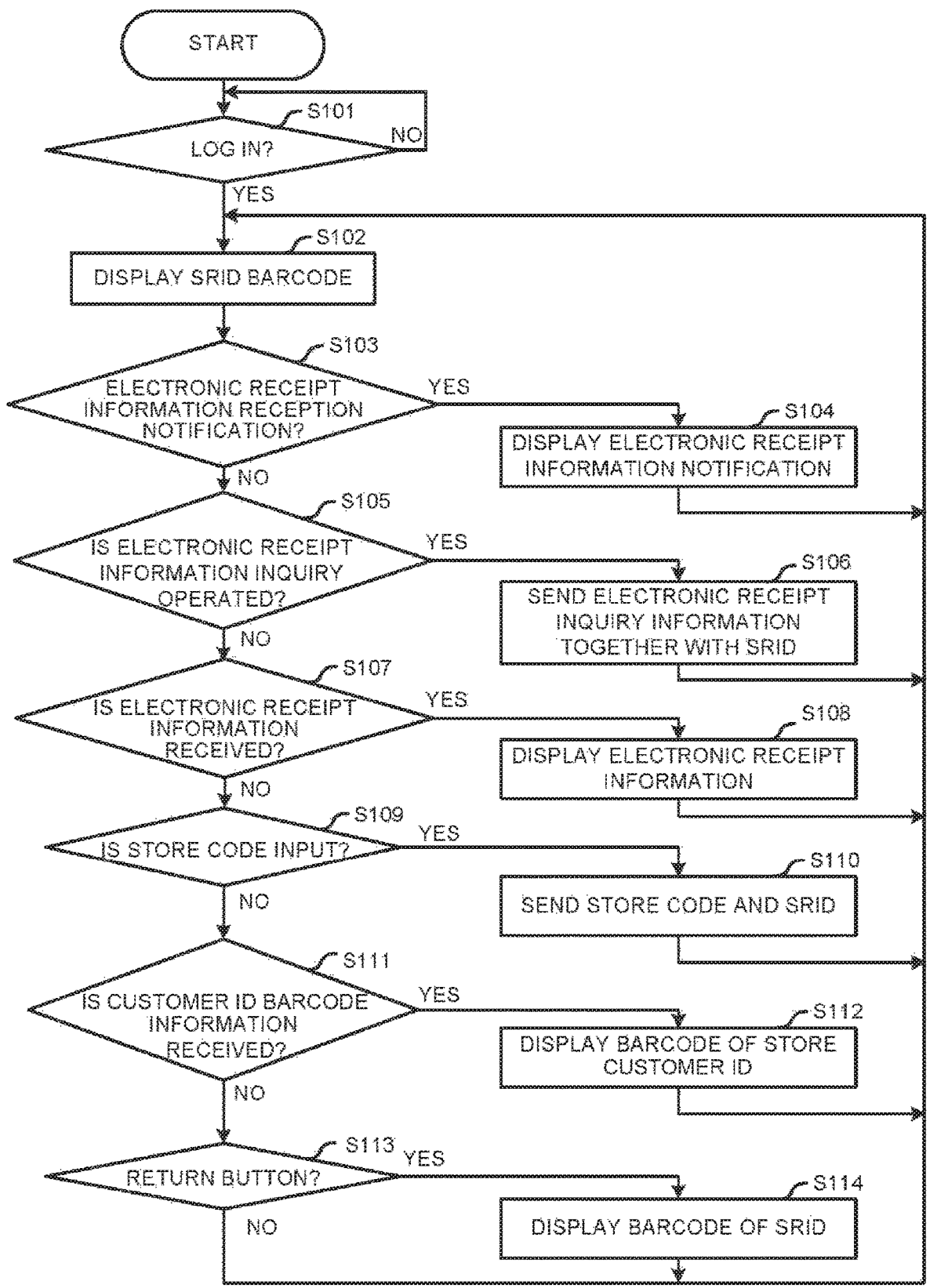
FIG. 14 is a flowchart illustrating the flow of a control processing of the portable terminal carried out by the first embodiment.

As shown in FIG. 14, the control unit 71 determines whether or not a user logs in to a system (ACT S101). The electronic receipt cannot be received and the store customer ID cannot be displayed until the user logs in. Thus, the control unit 71 waits until the user logs in to receive the electronic receipt and display the store customer ID (NO in ACT S101). During the waiting period, the control unit 71 can execute other processing. If the user logs in (YES in ACT S101), the control unit 71 (first customer identification information display module 715) displays the barcode corresponding to the SRID stored in the SRID storage section 75c on the display unit 73 (ACT S102).

Figure 15:
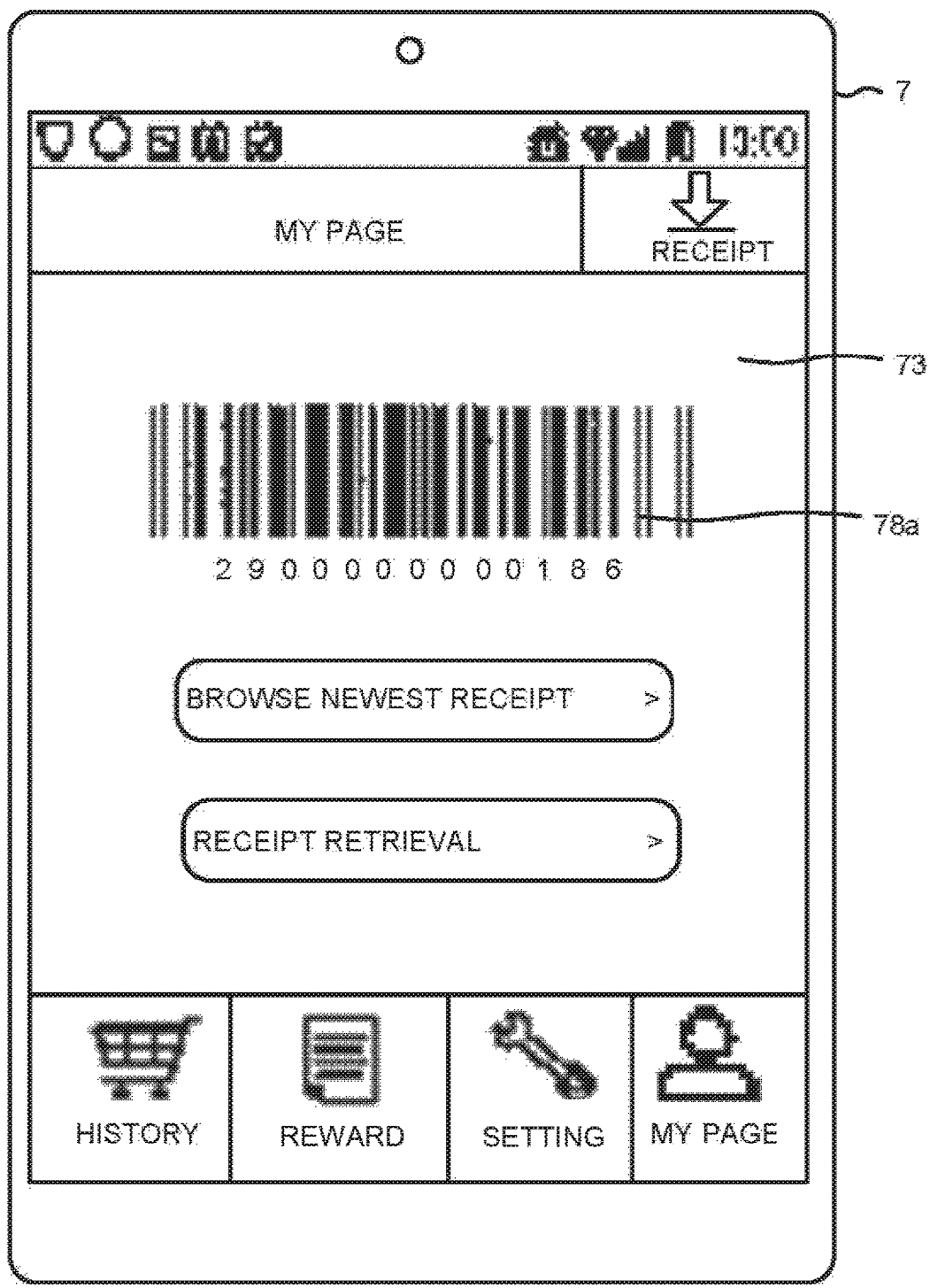
FIGS. 15-17 each illustrate an example of a display screen on the portable terminal according to the first embodiment.

FIG. 15 shows an example of the portable terminal 7 on which a barcode of the SRID is displayed. In FIG. 15, a barcode 78a indicating the SRID is displayed on the display unit 73 of the portable terminal 7. The POS terminal 1 can identify the portable terminal 7 by reading the barcode 78a with the code reading unit 15 and decoding the barcode 78a.

Next, the control unit 71 determines whether or not the electronic receipt management server 4 sends a notification that the electronic receipt information is received from the electronic receipt server 3 (ACT S103). If it is determined that the notification is received (YES in ACT S103), the control unit 71 displays a message indicating the reception, on the display unit 73 (ACT S104). The message is, for example, "the electronic receipt of the customer is received".

If it is determined that the notification is not received (NO in ACT S103), the control unit 71 determines whether or not the request for the electronic receipt information is operated (ACT S105). The user of portable terminal 7 who saw the notification operates the operation unit 72 to send the request for the electronic receipt information. If it is determined that the request is operated (YES in ACT S105), the control unit sends the request for the electronic receipt to the electronic receipt management server 4 together with the SRID stored in the SRID storage section 75c for identifying the portable terminal 7 (ACT S106). The electronic receipt management server 4 that has received the request executes the processing in ACT S81-ACT S83 in FIG. 12 to send the electronic receipt information to the portable terminal 7.

On the other hand, if it is determined that the request for the electronic receipt information is not operated (NO in ACT S105), the control unit 71 determines whether or not the electronic receipt information is received from the electronic receipt management server 4 (ACT S107). If it is determined that the electronic receipt information is received (YES in ACT S107), the control unit 71 displays the received electronic receipt information on the display unit 73 (ACT S108). If only the electronic receipt information is received, the control unit 71 displays the electronic receipt information only.

If it is determined that the electronic receipt information is not received (NO in ACT S107), the control unit 71 (input module 712) determines whether or not the store code is input by reading the two-dimensional code attached the POS terminal 1 or displayed near the entrance of the store P1 by the portable terminal 7 (ACT S109). If it is determined that the store code is input (YES in ACT S109), the control unit 71 (sending module 713) sends the input store code and the SRID stored in the SRID storage section 75c to the electronic receipt management server 4 (ACT S110). The electronic receipt management server 4 receiving the store code and the SRID executes the processing in ACT S91-ACT S94 to send information of a code symbol corresponding to the store customer ID, to the portable terminal 7.

If it is determined that the store code is not input (NO in ACT S109), the control unit 71 determines whether or not the store customer ID in the form of a code symbol is received (ACT S111). If it is determined that the store customer ID in the form of a code symbol is received (YES in ACT S111), the control unit 71 (second customer identification information display module 714) displays the barcode of the received store customer ID on the display unit 73 (ACT S112). In this case, the control unit 71 displays the barcode of the store customer ID instead of the barcode of the SRID displayed in ACT S102.

Figure 16:
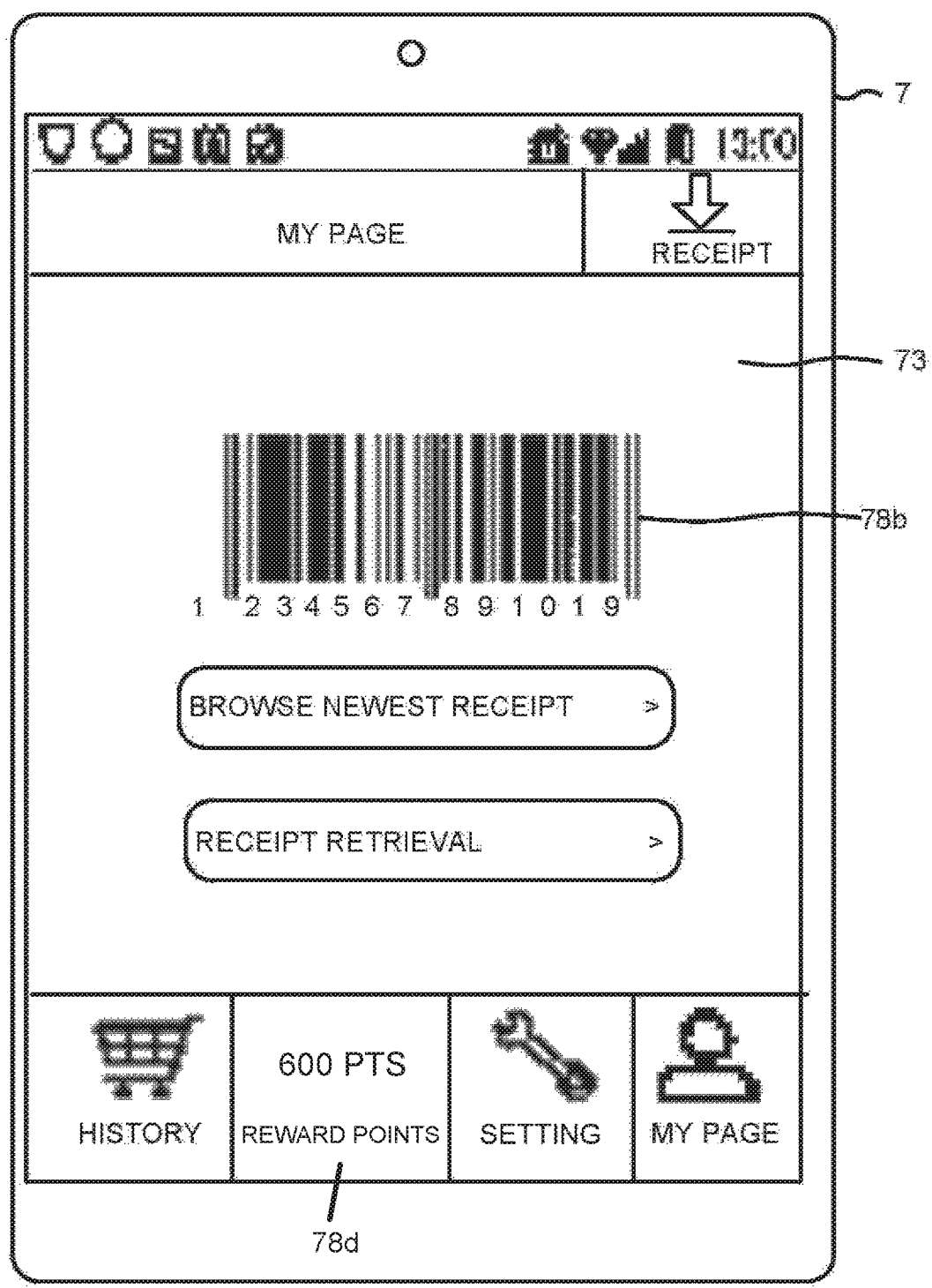

FIG. 16 shows an example of the portable terminal 7 on which the barcode of the store customer ID is displayed. In FIG. 16, a barcode 78b of the store customer ID is displayed on the display unit 73 of the portable terminal 7. The POS terminal 1 can identifies the store customer ID of the loyalty card owned by the customer who carries the portable terminal 7 in the store by reading the barcode 78b with the code reading unit 15 thereof and decoding the barcode 78b. Then the POS terminal 1 executes a processing for giving reward points to the customer identified by the read store customer ID. Further, the display unit 73 of the portable terminal 7 includes total reward points 78d earned at the store, for which the customer owns the store customer ID.

If it is determined that the store customer ID is not received (NO in ACT S111), the control unit 71 determines whether or not a "return button" (not shown) displayed on the portable terminal 7 is selected (ACT S113). If it is determined that the button is selected (YES in ACT S113), the control unit 71 displays the barcode corresponding to the SRID stored in the SRID storage section 75c (ACT S114). Further, if it is determined that the "return button" is not selected (NO in ACT S113), the control unit 71 returns to ACT S103.

In the present embodiment, when the display processing in ACT S112 is being executed, the barcode corresponding to the SRID disappear and the barcode corresponding to the store customer ID is displayed instead; however, it is not limited to this. For example, both the barcode of the SRID and the barcode of the store customer ID may be displayed.

Figure 17:
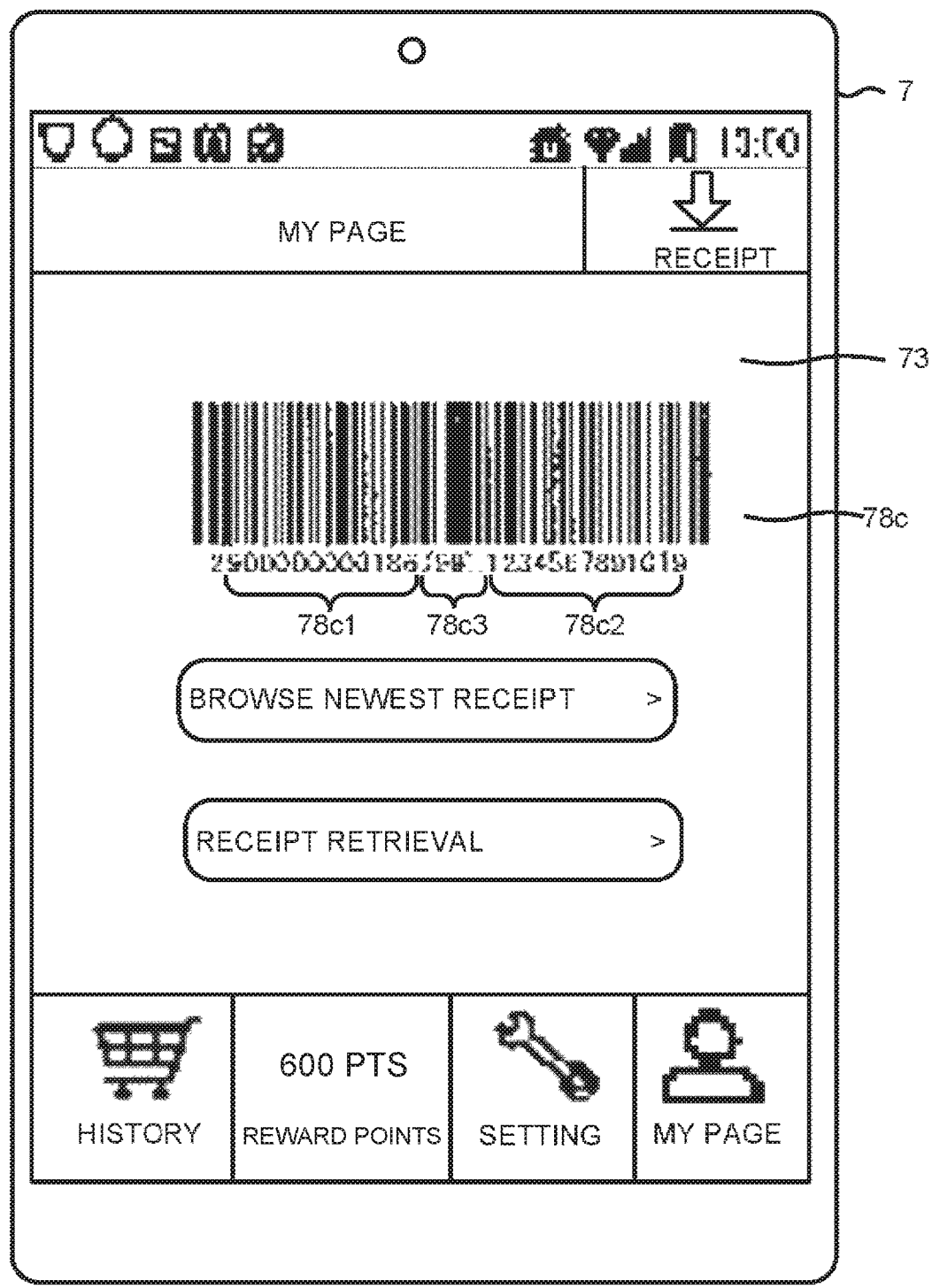

FIG. 17 shows an example of the portable terminal 7 on which both the barcode corresponding to both the SRID and the store customer ID is displayed. In FIG. 17, a barcode 78c displayed on the display unit 73 includes a barcode portion 78c1 corresponding to the SRID, a barcode portion 78c2 corresponding to the store customer ID, and a delimiter portion 78c3 (a part indicated by (99)) functioning as a boundary between the barcode portion 78c1 corresponding to the SRID and the barcode portion 78c2 corresponding to the store customer ID.

The POS terminal 1 which read the barcode 78c recognizes the barcode portion 78c1 at the left side of the delimiter portion 78c3 as the barcode portion corresponding to the SRID and decodes the SRID from the barcode. The POS terminal 1 further recognizes the barcode portion 78c2 at the right side of the delimiter portion 78c3 as the barcode portion corresponding to the store customer ID and decodes the store customer ID from the barcode. When the portable terminal 7 carries out such a display processing, in this way, the POS terminal 1 can identify both the SRID and the store customer ID from the read barcode.

As stated above, according to the first embodiment, the portable terminal 7 sends, if the store code is input, the store code to the electronic receipt management server 4 together with the stored SRID. The electronic receipt management server 4 reads the store customer ID (that is, the store customer ID for identifying the customer of the store) for identifying the loyalty card that can be used in the store based on the received SRID and the store code and then sends the store customer ID to the portable terminal 7. The portable terminal 7 displays the received store customer ID on the display unit 73. That is, the portable terminal 7 displays the customer identification information in the store, therefore, the POS terminal 1 which read the display can give reward points to the identified customer based on the store customer ID.

Second Embodiment

Figure 18:
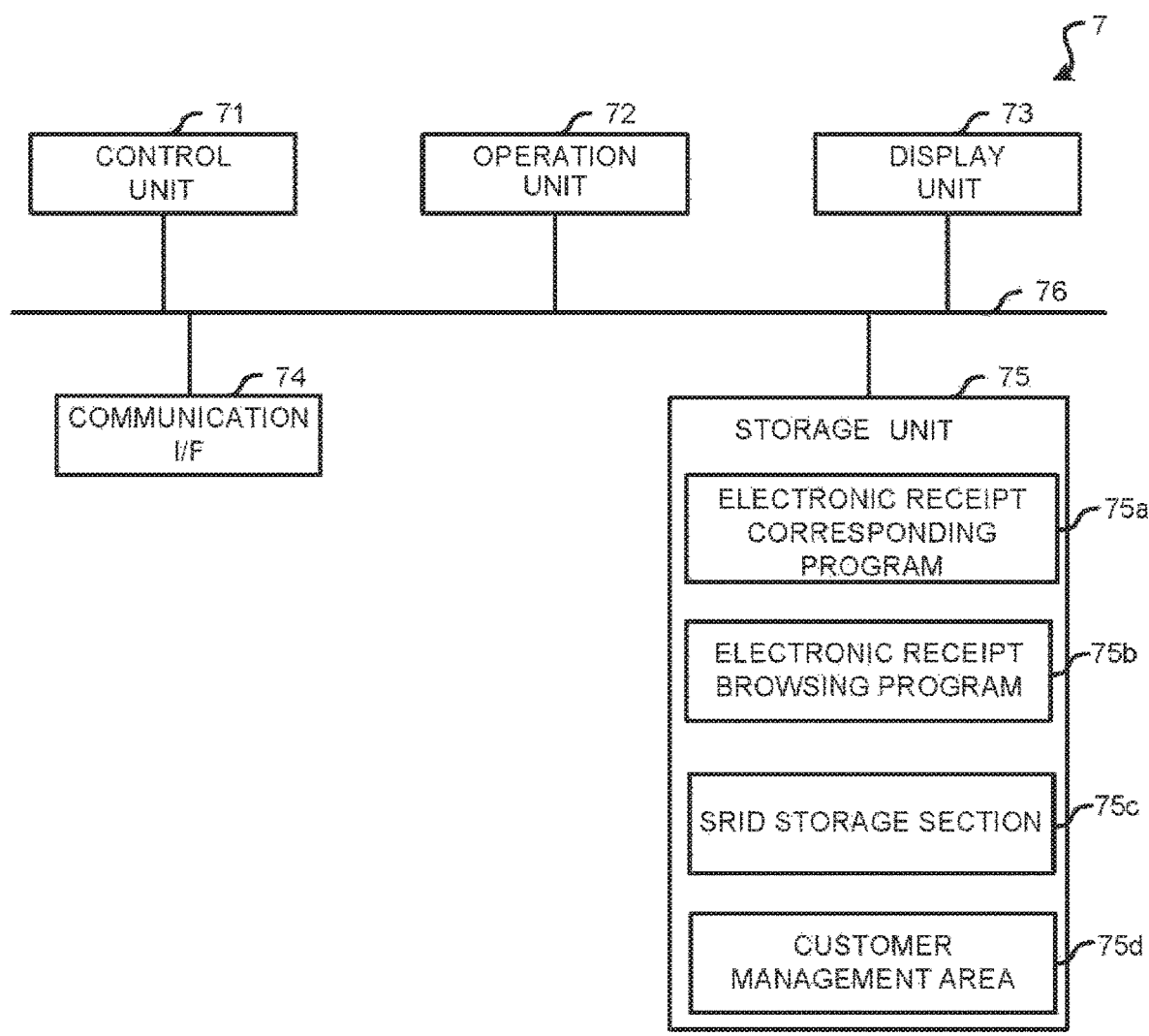
FIG. 18 is a block diagram of a portable terminal in an electronic receipt management system according to a second embodiment.

Next, a second embodiment of the present invention is described with reference to FIGS. 18-20. The second embodiment is different from the first embodiment in terms of the configuration of the portable terminal 7. The other configuration according to the second embodiment is the same as the first embodiment. FIG. 18 illustrates hardware configuration of the portable terminal 7 according to the second embodiment. In the description of FIG. 18, only points different from the portable terminal shown in FIG. 8 are described. The other points that are not described are the same as those shown in FIG. 8. In FIG. 18, the portable terminal 7 includes a customer management area 75d. The customer management area 75d is the same as the customer management area 43d shown in FIG. 5.

Next, a flow of the electronic receipt reception processing carried out when the control unit 71 of the portable terminal 7 executes the electronic receipt corresponding program 75a and a flow of the electronic receipt browsing processing carried out when the control unit 71 of the portable terminal 7 executes the electronic receipt browsing program 75b are described with reference to the functional block diagram shown in FIG. 19 and the flowchart shown in FIG. 20.

Figure 19:
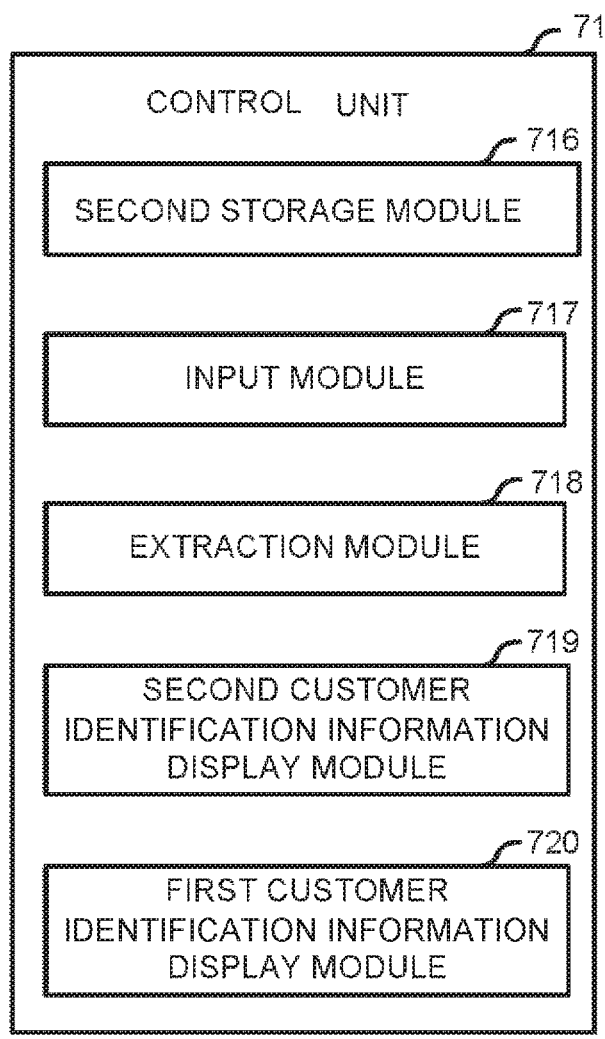
FIG. 19 illustrates functional blocks generated in the portable terminal according to the second embodiment.

As shown in FIG. 19, when the electronic receipt corresponding program 75a and the electronic receipt browsing program 75b are executed by the portable terminal 7, modules including a second storage module 716, an input module 717, an extraction module 718, a second customer identification information display module 719, and a first customer identification information display module 720, are generated. As practical hardware, the CPU of the control unit 71 reads and executes the electronic receipt corresponding program 75a and the electronic receipt browsing program 75b from the storage unit 75 to generate the second storage module 716, the input module 717, the extraction module 718, the second customer identification information display module 719, and the first customer identification information display module 720.

The second storage module 716 stores the store identification information for identifying the store and the second customer identification information for identifying the customer of the store in an associated manner.

The input module 717 inputs the store identification information for identifying the store.

The extraction module 718 extracts the second customer identification information stored in association with the input store identification information.

The second customer identification information display module 719 displays the extracted second customer identification information.

The first customer identification information display module 720 displays the first customer identification information.

Next, the flow of the electronic receipt reception processing carried out when the control unit 71 of the portable terminal 7 executes the electronic receipt corresponding program 75a and the flow of the electronic receipt browsing processing carried out when the control unit 71 of the portable terminal 7 executes the electronic receipt browsing program 75b are described with reference to FIG. 20. Further, in FIG. 20, the same description as FIG. 14 is omitted or simplified.

Figure 20:
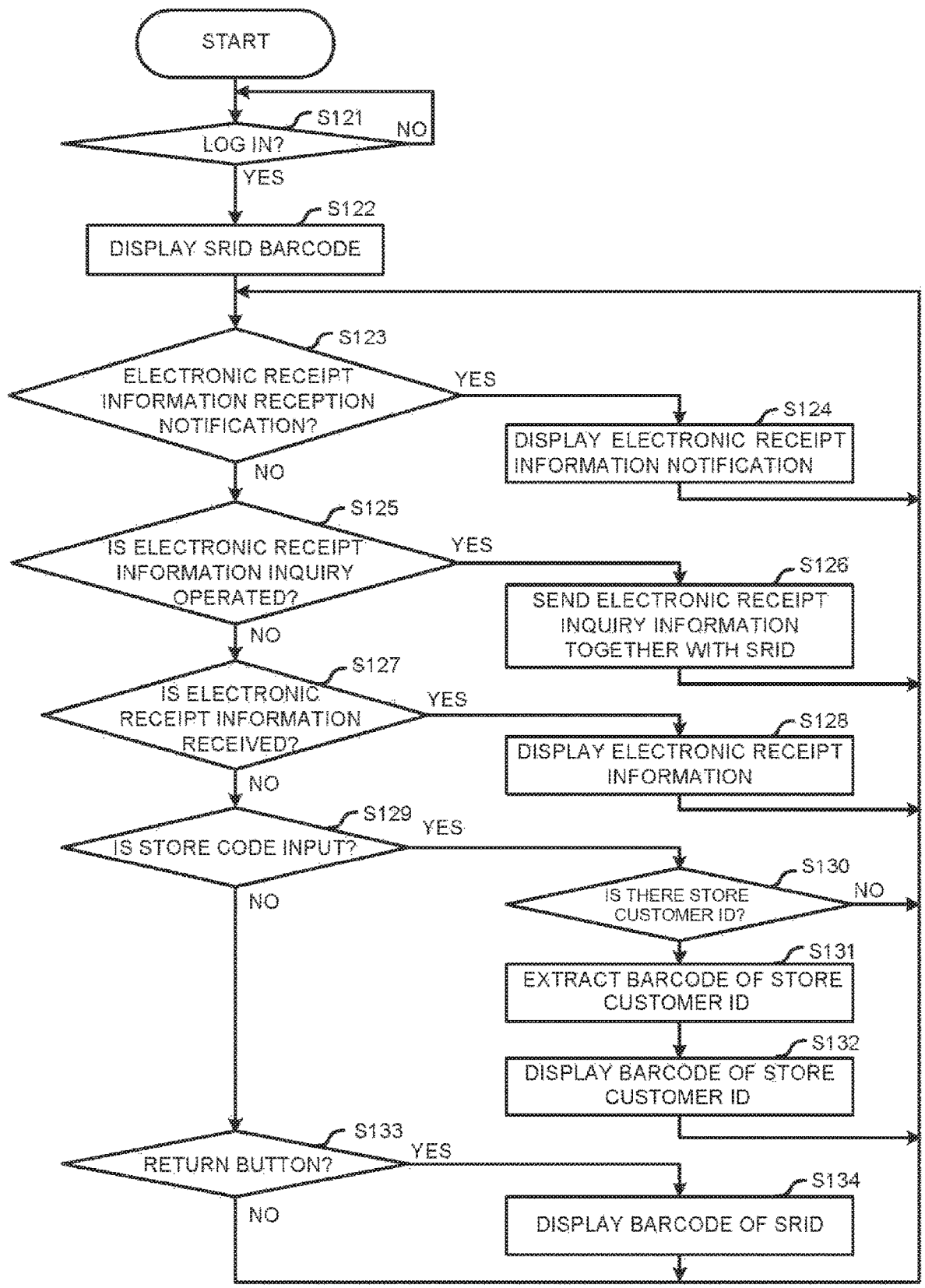
FIG. 20 is a flowchart illustrating the flow of a control processing carried out by the portable terminal according to the second embodiment.

In FIG. 20, the processing executed by the control unit 71 in ACT S121-ACT S129 is the same as the processing in ACT S101-ACT S109 in FIG. 14, thus, the description thereof is omitted. In ACT S129, if it is determined that the store code is input (YES in ACT S129), the control unit 71 checks the customer management area 75d and determines whether or not the store customer ID exists, based on the SRID stored in the SRID storage section 75c and the input store code (ACT S130). If it is determined that the store customer ID exists (YES in ACT S130), the control unit 71 (extraction module 718) extracts the store customer ID from the customer management area 75d (ACT S131). The control unit 71 (second customer identification information display module 719) displays the barcode of the read store customer ID on the display unit 73 (ACT S132).

If it is determined that the store code is not input (NO in ACT S129), the control unit 71 executes the processing in ACT S133 and ACT S134, which is the same as the processing in ACT S113 and ACT S114 in FIG. 14.

According to the second embodiment, the portable terminal 7 identifies, if the store code is input, the store customer ID based on the stored SRID and displays the store customer ID on the display unit 73. That is, the portable terminal 7 displays the customer identification information in the store instead of the SRID, thus, the POS terminal 1 which read the display can give reward points to the identified customer based on the store customer ID.

Further, according to the second embodiment, the portable terminal 7 itself extracts and displays the store customer ID without requesting the electronic receipt management server 4 to send the store customer ID, thus, the store customer ID can be extracted and displayed even if, for example, any failure occurs in the network N5 between the portable terminal 7 and the electronic receipt management server 4.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the embodiments described above, the SRID for identifying the customer who enjoys the electronic receipt service is exemplified as the first customer identification information, and the member ID for identifying the customer who enjoys the reward point service is exemplified as the second customer identification information; however, the first customer identification information and the second customer identification information are not limited to these IDs. Further, a loyalty card is exemplified as the member medium issued by the store; however, no specific limitation is given to the category of the card as long as it is a card issued by the store.

Further, the programs executed by the electronic receipt management server 4 and the portable terminal 7 according to the embodiments may be recorded in a non-transitory computer-readable recording medium such as CD-ROM, flexible disk (FD), CD-R, DVD (Digital Versatile Disk) and the like in the form of installable or executable file.

Moreover, the programs executed by the electronic receipt management server 4 and the portable terminal 7 according to the embodiments may be stored in a computer connected to a network such as internet, and downloaded via the network. Further, the programs executed by the electronic receipt management server 4 and the portable terminal 7 according to the embodiments may also be provided or distributed via a network such as the Internet.

The programs executed by the electronic receipt management server 4 and the portable terminal 7 according to the embodiments may also be installed in the ROM in advance.

What is claimed is:

1. A mobile terminal of a user, comprising:
a display device;
an imaging device;
a memory that stores:
an electronic receipt user ID, and
a plurality of member IDs each associated with a store code; and
a processor configured to
when a user logs into the mobile terminal, encode the electronic receipt user ID into a first symbol and control the display device to display an image of the first symbol, and
when an image of a second symbol displayed in a store and indicating a store code is acquired by the imaging device,
decode the second symbol into the store code and retrieve from the memory one of the member IDs associated with the store code,
generate an image of a third symbol indicating said one of the member IDs, and
control the display device to display the generated image of the third symbol instead of the image of the first symbol, wherein
a point-of-sale (POS) terminal of the store uses:
the image of the first symbol to generate information for an electronic receipt, the information including the electronic receipt user ID, and
the generated image of the third symbol to identify the user as a member of the store.

2. The mobile terminal according to claim 1, wherein
upon receipt of a notification indicating that the electronic receipt is received, from a server via a first network before receiving the electronic receipt, the processor controls the display device to display the notification.

3. The mobile terminal according to claim 2, wherein
the server is an electronic receipt management server configured to receive the electronic receipt from a store server via a second network that is different from the first network.

4. The mobile terminal according to claim 3, wherein
the electronic receipt is transmitted from the store server via an electronic receipt server configured to communicate with both the electronic receipt management server and the store server.

5. The mobile terminal according to claim 2, further comprising:
a network interface, wherein
upon receipt of a predetermined input by a user via an input device, the processor controls the network interface to transmit a request for the electronic receipt to the server.

6. The mobile terminal according to claim 1, wherein
the processor is further configured to, upon receipt of the electronic receipt from a server, control the display device to display the electronic receipt, and
the image of the third symbol is displayed in a screen through which a request for the electronic receipt can be sent.

7. A mobile terminal according to claim 1, wherein the processor is further configured to, after retrieving said one of the member IDs:
generate an image of a symbol indicating both said one of the member IDs and the electronic receipt user ID, and
control the display device to display the generated image.

8. A non-transitory computer readable medium storing a program causing a mobile terminal of a user to execute a method comprising:
storing in a memory:
an electronic receipt user ID, and
a plurality of member IDs each associated with a store code;
when a user logs into the mobile terminal, encoding the electronic receipt user ID into a first symbol and displaying an image of the first symbol;
when an image of a second symbol displayed in a store and indicating a store code is acquired,
decoding the second symbol into the store code and retrieving from the memory one of the member IDs associated with the store code;
generating an image of a third symbol indicating said one of the member IDs; and
displaying the generated image of the third symbol instead of the image of the first symbol, wherein
a point-of-sale (POS) terminal of the store uses:
the image of the first symbol to generate information for an electronic receipt, the information including the electronic receipt user ID, and
the generated image of the third symbol to identify the user as a member of the store.

9. The computer readable medium according to claim 8, wherein
the method further comprises:
upon receipt of a notification indicating that the electronic receipt is received, from a server via a first network before receiving the electronic receipt, displaying the notification.

10. The computer readable medium according to claim 9, wherein
the server is an electronic receipt management server configured to receive the electronic receipt from a store server via a second network that is different from the first network.

11. The computer readable medium according to claim 10, wherein
the electronic receipt is transmitted from the store server via an electronic receipt server configured to communicate with both the electronic receipt management server and the store server.

12. The computer readable medium according to claim 8, wherein
the method further comprises, upon receipt of an electronic receipt from a server via a wireless network interface, displaying the electronic receipt on a display, and
the image of the third symbol is displayed in a screen through which a request for the electronic receipt can be sent.

13. A method performed by a mobile terminal of a user, comprising:
storing in a memory:
an electronic receipt user ID, and
a plurality of member IDs each associated with a store code;
when a user logs into the mobile terminal, encoding the electronic receipt user ID into a first symbol and displaying an image of the first symbol;
when an image of a second symbol displayed in a store and indicating a store code is acquired,
decoding the second symbol into the store code and retrieving from the memory one of the member IDs associated with the store code;
generating an image of a third symbol indicating said one of the member IDs; and
displaying the image of the third symbol instead of the image of the first symbol, wherein
a point-of-sale (POS) terminal of the store uses:
the image of the first symbol to generate information for an electronic receipt, the information including the electronic receipt user ID, and
the generated image of the third symbol to identify the user as a member of the store.

14. The method according to claim 13, further comprising:
upon receipt of an electronic receipt from a server via a wireless network interface, displaying the electronic receipt on a display, wherein
the image of the third symbol is displayed in a screen through which a request for the electronic receipt can be sent.

* * * * *